United States Patent
Urakata et al.

(10) Patent No.: US 12,031,720 B2
(45) Date of Patent: Jul. 9, 2024

(54) PULVERIZED COAL DRYING SYSTEM FOR PULVERIZER, PULVERIZED COAL DRYING METHOD THEREFOR, PULVERIZED COAL DRYING PROGRAM, PULVERIZER, AND INTEGRATED GASIFICATION COMBINED CYCLE

(71) Applicant: MITSUBISHI POWER, LTD., Yokohama (JP)

(72) Inventors: Yuichiro Urakata, Yokohama (JP); Koji Nishimura, Yokohama (JP); Jun Kasai, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 516 days.

(21) Appl. No.: 17/269,012

(22) PCT Filed: Nov. 19, 2019

(86) PCT No.: PCT/JP2019/045257
§ 371 (c)(1),
(2) Date: Feb. 17, 2021

(87) PCT Pub. No.: WO2020/105629
PCT Pub. Date: May 28, 2020

(65) Prior Publication Data
US 2021/0325041 A1 Oct. 21, 2021

(30) Foreign Application Priority Data
Nov. 21, 2018 (JP) .................. 2018-218426

(51) Int. Cl.
*F23K 1/04* (2006.01)
*C10J 3/46* (2006.01)
*F23K 3/02* (2006.01)

(52) U.S. Cl.
CPC .................... *F23K 1/04* (2013.01); *C10J 3/46* (2013.01); *F23K 3/02* (2013.01); *F23K 2200/00* (2013.01);
(Continued)

(58) Field of Classification Search
None
See application file for complete search history.

(56) References Cited

U.S. PATENT DOCUMENTS

| 5,191,724 A | 3/1993 | Fontanille | |
| 2009/0217574 A1* | 9/2009 | Coleman | C10L 9/10 |
| | | | 202/99 |

(Continued)

FOREIGN PATENT DOCUMENTS

| CN | 1221778 A | 7/1999 |
| CN | 204853531 U | 12/2015 |

(Continued)

OTHER PUBLICATIONS

Office Action dated Jan. 18, 2023, issued in counterpart CN application No. 201980054378.0. (11 pages).

(Continued)

*Primary Examiner* — Jason Lau
(74) *Attorney, Agent, or Firm* — WHDA, LLP

(57) ABSTRACT

An object of the present invention is to provide a pulverized coal drying system for a pulverizer, a pulverized coal drying method therefor, a pulverized coal drying program, a pulverizer, and an integrated gasification combined cycle capable of stably drying a carbonaceous feedstock irrespective of the type of the carbonaceous feedstock to be used. There is provided a controller (50) of a pulverizer (10) that dries a supplied carbonaceous feedstock by using a drying fluid and includes a flow rate controller that controls the flow rate of the drying fluid within upper and lower limits of the (Continued)

flow rate of the drying fluid that are set to dry a plurality of types of the carbonaceous feedstock having different moisture contents in such a way that the temperature of the drying fluid discharged from the pulverizer (10) approaches a target temperature.

8 Claims, 9 Drawing Sheets

(52) U.S. Cl.
CPC .... *F23K 2201/103* (2013.01); *F23K 2201/20* (2013.01); *F23K 2900/05001* (2013.01)

(56) References Cited

U.S. PATENT DOCUMENTS

| | | | | |
|---|---|---|---|---|
| 2010/0205821 | A1* | 8/2010 | Tada | F26B 21/083 34/570 |
| 2011/0271587 | A1 | 11/2011 | Goedert et al. | |

FOREIGN PATENT DOCUMENTS

| | | |
|---|---|---|
| FR | 1108175 A | 1/1956 |
| GB | 756803 A | 9/1956 |
| JP | H06-017741 B2 | 3/1994 |
| JP | 2000-212581 A | 8/2000 |
| JP | 4508443 B2 | 7/2010 |
| JP | 2013-170463 A | 9/2013 |
| JP | 2014-141619 A | 8/2014 |
| JP | 2014-159935 A | 9/2014 |
| JP | 2015-105812 A | 6/2015 |
| JP | 2016-223649 A | 12/2016 |
| JP | 2017-101885 A | 6/2017 |
| JP | 2018-123993 A | 8/2018 |
| JP | 2018-176123 A | 11/2018 |
| JP | 2019-156927 A | 9/2019 |
| WO | 2015/158476 A1 | 10/2015 |

OTHER PUBLICATIONS

International Search Report dated Feb. 10, 2020, issued in counterpart Application No. PCT/JP2019/045257, with English Translation. (7 pages).

Written Opinion Report dated Feb. 10, 2020, issued in counterpart Application No. PCT/JP2019/045257, with English Translation. (11 pages).

* cited by examiner

COAL TYPE A

COAL TYPE B

PULVERIZED COAL DRYING SYSTEM FOR PULVERIZER, PULVERIZED COAL DRYING METHOD THEREFOR, PULVERIZED COAL DRYING PROGRAM, PULVERIZER, AND INTEGRATED GASIFICATION COMBINED CYCLE

TECHNICAL FIELD

The present invention relates to a pulverized coal drying system for a pulverizer, a pulverized coal drying method therefor, a pulverized coal drying program, a pulverizer, and an integrated gasification combined cycle.

BACKGROUND ART

In related art, carbon-containing solid fuel, such as coal, is supplied to a combustion device after being crushed by a crusher (mill) into fine particles smaller than a predetermined particle diameter. The mill crushes the carbon-containing solid fuel, such as coal, loaded onto a rotary table by crunching the carbon-containing solid fuel between the rotary table and a roller, a classifier sorts out particles having small particle sizes from the crushed particulate fuel with the aid of a fluid (transport gas) supplied via the outer circumference of the rotary table, and the sorted fuel particles are transported to a combustion device installed, for example, in a boiler and combusted to produce a high-temperature combustion gas. For example, in a thermal power generation plant, steam is produced by heat drawn from the combustion gas produced by the combustion in the boiler, and a turbine is rotated by the steam to generate power.

In a coal-gasification-based power generation plant, carbon-containing solid fuel crushed by a crusher (crushed pulverized coal) is partially combusted in a coal gasification furnace to produce a gas, and the produced gas (combustible gas) is used to generate power (PTL 1, for example).

CITATION LIST

Patent Literature

PTL 1
  Japanese Patent No. 4,508,443

SUMMARY OF INVENTION

Technical Problem

Carbonaceous feedstock (such as coal) is crushed in a crusher and dried at the same time by a fluid (transport gas) supplied to the crusher in such a way that the moisture content of the crushed fuel is a predetermined value or smaller. When there are a plurality of types of carbonaceous feedstock (such as coal) to be used, however, the carbonaceous feedstocks have different characteristics (moisture content and amount of generated heat). In general, the relationship between the amount of supplied coal and the flow rate of a drying fluid required to dry the amount of supplied pulverized coal (air volume curve) is used on a coal type basis, and an appropriate air volume curve is selected whenever the coal type is switched to another to operate the plant in some cases. Therefore, when a complicated judgment is required to select an air volume curve when the coal type is switched, an error may occur. When the coal type is switched, it takes time and labor to select an air volume curve. It is in some cases difficult, in particular, to identify the coal type switchover timing.

The present invention has been made in view of the circumstances described above, and an object of the present invention is to provide a pulverized coal drying system for a pulverizer, a pulverized coal drying method therefor, a pulverized coal drying program, a pulverizer, and an integrated gasification combined cycle capable of stably drying a carbonaceous feedstock (such as coal) irrespective of the type of the carbonaceous feedstock (carbon type, such as coal) to be used.

Solution to Problem

A first aspect of the present invention relates to a pulverized coal drying system for a pulverizer that dries a supplied carbonaceous feedstock by using a drying fluid, the pulverized coal drying system including a flow rate controller that controls a flow rate of the drying fluid within upper and lower limits of the flow rate of the drying fluid that are set to dry a plurality of types of the carbonaceous feedstock having different moisture contents in such a way that a temperature of the drying fluid discharged from the pulverizer approaches a target temperature.

According to the configuration described above, the upper and lower limits of the flow rate of the drying fluid are so set that a plurality of types of carbonaceous feedstock can be dried, and the flow rate of the drying fluid is so controlled within the upper and lower limits that the temperature of the drying fluid discharged from the pulverizer approaches the target temperature, whereby the plurality of types of carbonaceous feedstock can be handled. Specifically, it is unnecessary to hold data, for example, on the air volume curve on a coal type basis or select an appropriate air volume curve each time in accordance, for example, with judgment made by an operator who selects data on the coal type to be used, unlike in the related art, whereby a human error that may occur when the coal type is switched can be suppressed, and the time and labor in the data selection can be eliminated for reduction in the burden on the operator. The carbonaceous feedstock can therefore be stably dried irrespective of the coal type of carbonaceous feedstock to be used. The types of carbonaceous feedstock are classified in terms of the moisture content in a carbonaceous feedstock. For example, when the carbonaceous feedstock is coal, the rank of coalification correlates to the moisture content, so that the type of coal is classified in terms of the rank of coalification.

In the pulverized coal drying system described above, the upper and lower limits may be set with respect to a predetermined amount or supplied carbonaceous feedstock in the state in which the drying fluid discharged from the pulverizer has the target temperature in such a way that the upper limit is the flow rate of the drying fluid for drying the carbonaceous feedstock containing a largest moisture content and the lower limit is the flow rate of the drying fluid for drying the carbonaceous feedstock containing a lowest moisture content.

According to the configuration described above, in the state in which the drying fluid discharged from the pulverizer has the target temperature, the upper and lower limits of the flow rate of the drying fluid can be appropriately set with respect to the amount of supplied carbonaceous feedstock in correspondence with the plurality of types of carbonaceous feedstock to be used. The flow rate of the drying fluid with respect to the plurality of types of carbonaceous feedstock can thus be appropriately set.

The pulverized coal drying system described above may include a temperature setter that lowers the target temperature by a predetermined temperature when the flow rate of the drying fluid reaches the upper limit of the upper and lower limits and raises the target temperature by a predetermined temperature when the flow rate of the drying fluid reaches the lower limit or the upper and lower limits.

According to the configuration described above, it is determined that the moisture content in the flow rate of the supplied carbonaceous feedstock is high when the flow rate of the drying fluid reaches the upper limit and the target temperature of the drying fluid discharged from the pulverizer is lowered by the predetermined temperature, and it is determined that the moisture content of the supplied carbonaceous feedstock is low when the flow rate of the drying fluid reaches the lower limit and the target temperature of the drying fluid discharged from the pulverizer is raised by the predetermined temperature, whereby a decrease in the response of the flow rate of the drying fluid can be suppressed. For example, when the flow rate of the drying fluid reaches the upper limit, a mechanism that adjusts the flow rate of the drying fluid operates in some cases in a state in which the limit of the operable region of the mechanism has been almost reached (valve is fully open, for example). In such a case, the flow rate control response is likely to lower. To avoid the problem described above, a necessary flow rate of the drying fluid can be reduced by lowering the target temperature of the drying fluid discharged from the pulverizer by the predetermined temperature, whereby the mechanism that adjusts the flow rate of the drying fluid is allowed to operate with a margin, a decrease in the response of the flow rate of the drying fluid can therefore be suppressed, whereby the response of the flow rate of the drying fluid can be improved. The predetermined temperature is the amount of temperature change that still allows a change in the performance of the pulverized coal supplying system to fail within an acceptable range even when the target temperature of the drying fluid discharged from the pulverizer is changed multiple times. The predetermined temperature may, for example, be set at a value ranging from 0.5° C. to 2° C., further preferably, from 0.5° C. to 1° C.

The pulverized coal drying system described above may include a temperature setter that changes the target temperature in such a way that a conversion ratio at which carbonyl sulfide is converted into hydrogen sulfide in a raw syngas generated when the carbonaceous feedstock is partially combusted into a gas approaches a predetermined reference conversion ratio.

Conversion of the carbonyl sulfide (COS) into hydrogen sulfide ($H_2S$) allows the sulfur component (S component) to be readily recovered from the raw syngas. Conversion of the carbonyl sulfide into hydrogen sulfide ($H_2S$ conversion ratio), however, results from the moisture content in the raw syngas and depends on the moisture content contained in the pulverized coal. In other words, the $H_2S$ conversion ratio results from the dryness of the pulverized coal. In view of the fact described above, in the raw syngas generated when the carbonaceous feedstock is partially combusted into a gas, the temperature setter can change the target temperature of the drying fluid discharged from the pulverizer to adjust the dryness of the pulverized coal in such a way that the $H_2S$ conversion ratio approaches the predetermined reference conversion ratio. Since the $H_2S$ conversion ratio varies in accordance with the characteristics of the raw syngas, the conversion ratio is evaluated by ensuring that the amount of sulfur component in a purified gas at the exit of a desulfurization unit that is not shown is smaller than a limit. The limitation of the amount of sulfur component in the purified gas at the exit of the desulfurization unit varies in accordance, for example, with a plant site law.

The pulverized coal drying system described above may include a temperature setter that changes the target temperature in a raw syngas generated when the carbonaceous feedstock is partially combusted into a gas based on a flow rate of discharged water recovered from the raw syngas.

In the raw syngas generated when the carbonaceous feedstock is partially combusted into a gas, the flow rate or the discharged water results from the moisture content in the raw syngas and depends on the moisture content contained in the pulverized coal. In other words, the flow rate of the discharged water results from the dryness of the pulverized coal. In view of the fact described above, the target temperature of the drying fluid discharged from the pulverizer can be changed to adjust, the dryness of the pulverized coal to in turn adjust the flow rate of the discharged water.

A second aspect of the present invention relates to a pulverizer including the pulverized coal drying system described above.

A third aspect of the present invention relates to an integrated gasification combined cycle including a coal feeding unit including the pulverizer described above, a gas turbine rotated by combusting at least part of a fuel gas generated in a gasification unit, a steam turbine rotated by steam generated in a heat recovery boiler by using an exhaust gas discharged from the gas turbine, and a generator linked to the rotary motion of the gas turbine and/or the steam turbine.

A fourth aspect of the present invention relates to a pulverized coal drying method for a pulverizer that dries a supplied carbonaceous feedstock by using a drying fluid, the method including a flow rate control step of controlling a flow rate of the drying fluid within upper and lower limits of the flow rate of the drying fluid that are set to dry a plurality of types of the carbonaceous feedstock s having different moisture contents in such a way that a temperature of the drying fluid discharged from the pulverizer approaches a target temperature.

A fifth aspect of the present invention relates to a pulverized coal drying program for a pulverizer that dries a supplied carbonaceous feedstock by using a drying fluid, the program causing a computer to carry out a flow rate control process of controlling a flow rate of the drying fluid within upper and lower limits of the flow rate of the drying fluid that are set to dry a plurality of types of the carbonaceous feedstock s having different moisture contents in such a way that a temperature of the drying fluid discharged from the pulverizer approaches a target temperature.

Advantageous Effect of Invention

According to the present invention, the carbonaceous feedstock (such as coal) can be stably dried irrespective of the type of the carbonaceous feedstock (coal type, such as coal) to be used.

DESCRIPTION OF EMBODIMENTS

First Embodiment

Figure 1:
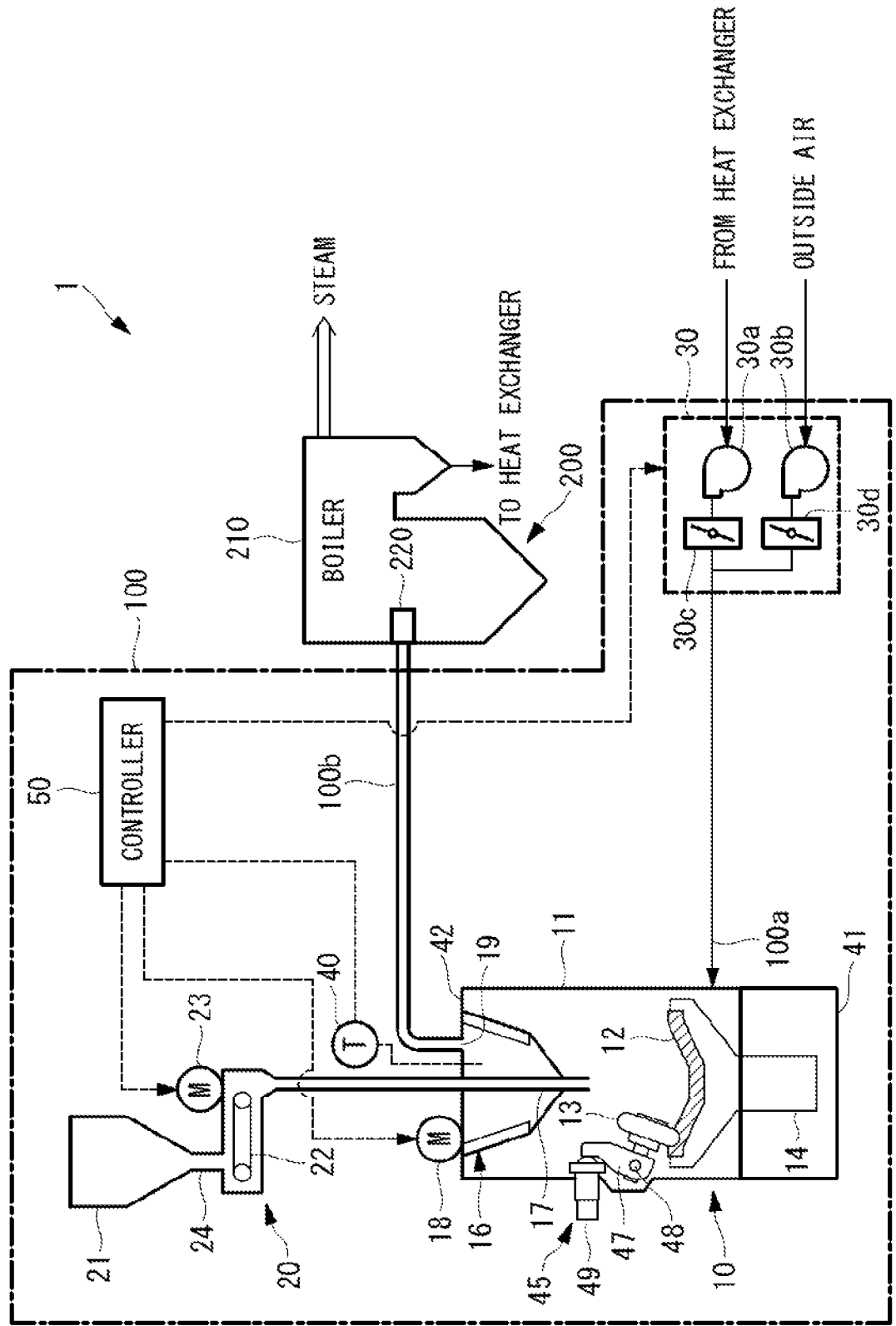
FIG. 1 shows a schematic configuration of a solid fuel crushing system according to a first embodiment of the present invention.

A first embodiment or the present invention will be described below with reference to the drawings.

A solid fuel crusher 100 in the present embodiment is an apparatus that handles a carbonaceous feedstock, such as a coal, as the fuel by way of example, crushes the carbonaceous feedstock (coal) to produce a pulverized fuel, such as pulverized coal, and supplies, for example, a burner section (combustion device) 220 of a boiler 200 with the pulverized fuel. The carbonaceous feedstock is not limited to coal and may, for example, be a biomass fuel. The boiler 200 may instead be a gasification unit 140, which will be described later. In the present embodiment, coal is used as the carbonaceous feedstock, and the present embodiment will be described with reference to a case where coal is crushed into pulverized coal. The carbonaceous feedstock is a fuel containing carbon and integrally represents coal (fuel before being crushed) and pulverized coal (fuel after being crushed). A boiler system (solid fuel crushing system) 1 including the solid fuel crusher 100 and the boiler 200 shown in FIG. 1 includes, for example, one solid fuel crusher 100. The boiler system 1 may, however, instead include a plurality of solid fuel crushers 100 corresponding to a plurality of burner sections 220 of one boiler 200.

The solid fuel crusher 100 in the present embodiment includes a mill (pulverizer) 10, a coal feeder (fuel supplier) 20, a blowing section 30, a state detector 40, and a controller (control apparatus) 50.

In the present embodiment, the terms of upper and upward represent the direction oriented vertically upward, and the term "above," such as an upper portion and an upper surface, represents a vertically upward portion. The term "below" similarly represents a vertically downward portion.

The pulverizer 10 includes a housing 11, a rotary table 12, a roller 13, a driver 14, a classifier 16, a fuel supplier 17, and a motor 18, which rotates the classifier 16.

The housing 11 is an enclosure that is formed in a tubular shape extending in the vertical direction and accommodates the rotary table 12, the roller 13, the classifier 16, and the fuel supplier 17.

The fuel supplier 17 is attached to a central portion of a ceiling 42 of the housing 11. The fuel supplier 17 supplies coal (carbon-containing solid fuel) guided from a banker 21 into the housing 11, is disposed in a central position in the housing 11 along the upward/downward direction, and has a lower end portion extending into the housing 11.

The driver 14 is disposed in the vicinity of a bottom surface 41 of the housing 11, and the rotary table 12, which is rotated by drive force transmitted from the driver 14, is rotatably disposed.

The rotary table 12 is a member having a circular shape in the plan view and is so disposed as to face the lower end of the fuel supplier 17. The upper surface of the rotary table 12 may have, for example, an inclining shape having a low central portion and having a height that increases toward the outer side with an outer circumferential portion bent upward. The fuel supplier 17 supplies the coal from above toward the rotary table 12, which is located below the fuel supplier 17, and the rotary table 12 is also called a crushing table because the supplied coal is crushed between the rotary table 12 and the roller 13.

When the coal is loaded from the fuel supplier 17 toward the center of the rotary table 12, the coal is guided by the centrifugal force produced by the rotation of the rotary table 12 toward the outer circumference of the rotary table 12 and sandwiched between the rotary table 12 and the roller 13, which crush the coal. The crushed coal forms pulverized coal, which is blown upward by a transport gas guided via a transport gas channel 100a and is then guided to the classifier 16. In other words, outlets (not shown) via which the transport gas flowing via the transport gas channel 100a flows out into the space above the rotary table 12 in the housing 11 are provided an a plurality or locations along the outer circumference of the rotary table 12. A vane (not shown) is disposed above each of the outlets and imparts swivel force to the transport gas having exited out of the outlets. The transport gas to which the vanes have imparted the swivel force forms an air flow having a swiveling velocity component and guides the coal (pulverized coal) crushed on the rotary table 12 to the classifier 16 in an upper portion of the housing 11. Out of the crushed coal mixed with the transport gas, particles having particle diameters greater than a predetermined particle diameter are classified by the classifier 16 or do not reach the classifier 16, fall back to the rotary table 12, and are crushed again.

The transport gas transports the pulverized coal (pulverized fuel) along with the transport gas via an exit 19 into a supply channel 100b and dries the pulverized coal at the same time in the pulverizer 10. In other words, the transport gas also serves as a drying fluid. As will be described later, the flow rate (air volume) of the transport gas is so controlled by the blowing section 30 that the transport gas dries the crushed pulverized coal.

The roller (crushing roller) 13 is a rotary element that crushes the coal supplied from the fuel supplier 17 onto the rotary table 12. The roller 13 is pressed against the upper surface of the rotary table 12 and cooperates with the rotary table 12 to crush the coal.

FIG. 1 shows only one roller 13 as a representative example, but a plurality of rollers 13 are so arranged as to face each other at fixed intervals in the circumferential direction in such a way that the rollers 13 are pressed against the upper surface of the rotary table 12. For example, three rollers 13 are arranged at uniform angular intervals of 120° C. in the circumferential direction at an outer circumferential portion of the rotary table 12. In this case, the portions where the three rollers 13 are in contact with the upper surface of the rotary table 12 (pressed portions) are separate from the center of the rotary table 12 by the same distance.

The rollers 13 are swingable upward and downward by journal heads 45 and are so supported as to be capable of approaching and moving away from the upper surface of the rotary table 12. When the rotary table 12 rotates with the outer circumferential surface of each of the rollers 13 being in contact with the upper surface of the rotary table 12, the rollers 13 receive rotary force from the rotary table 12 and are corotated with the rotary table 12. When the coal is supplied from the fuel supplier 17, the coal is pressed and crushed between the rollers 13 and the rotary table 12 into pulverized coal.

A support arm 47 of each of the journal heads 45 is so supported at the side surface of the housing 11 by a support shaft 48 having an intermediate portion extending along the horizontal direction as to be swingable in the roller upward/downward direction around the support shaft 48. A presser 49 is provided in an upper end portion of the support arm 47 that is a vertically upper portion. The pressers 49 are fixed to the housing 11 and impart a load to the rollers 13 via the support arms 47 and other components in such a way that the rollers 13 are pressed against the rotary table 12.

The driver 14 is an apparatus that transmits the drive force to the rotary table 12 to rotate the rotary table 12 around the center axis thereof. The driver 14 produces the drive force that rotates the rotary table 12.

The classifier 16 is provided in the upper portion of the housing 11, has a hollow, roughly inverted conical shape, and has a plurality of classifying vanes extending in the upward/downward direction and provided along the circumference around the center axis at predetermined intervals (uniform intervals). The classifier 16 is an apparatus that, classifies the coal crushed by the rollers 13 into particles having diameters greater than a predetermined particle diameter (Tor example, 70 to 100 µm in the case of coal) (crushed coal having diameters greater than predetermined particle diameter (pulverized coal) is particularly called "coarse powder fuel") and particles having diameters smaller than or equal to the predetermined particle diameter (crushed coal having diameters smaller than or equal to predetermined particle diameter (pulverized coal) is particularly called "fine powder fuel"). The external shape of the classifier 16 is, for example, an inverted truncated conical shape, and the classifier 16 is attached to the upper portion of the housing 11 along the cylinder axis of the roughly cylindrical housing 11 with classifying vanes arranged around the outer circumference of the classifier 16. Among a variety of types of classifier 16, a rotation-type classifier that performs rotation-based classification is also called a rotary separator. The motor 18 imparts the drive force to the classifier 16, which then rotates around the fuel supplier 17 with the upwardly and downwardly extending cylinder axis (not shown) of the housing 11 serving as the center axis.

The pulverized coal having reached the classifier 16 experiences the centrifugal force produced by the rotation of the classifying vanes and the centripetal force produced by the transport gas flow, which are balanced with each other, so that the coarse powder fuel having larger diameters collides with the classifying vanes and falls. The coarse powder fuel then returns onto the rotary table 12 and are crushed there again, and the resultant pulverized coal is guided to the exit 19, which is located at the ceiling 42 of the housing 11.

The pulverized coal classified by the classifier 16 is discharged into the supply channel 100*b* via the exit 19 and transported along with the transport gas. The pulverized coal flowed into the supply channel 100*b* is supplied to the burner section 220 of the boiler 200.

The fuel supplier 17, a lower end portion of which extends along the upward/downward direction in such a way that the lower end portion passes through the upper end of the housing 11 into the interior of the housing 11 and attached there, supplies a roughly central region of the rotary table 12 with the coal loaded from above. A coal feeder 20 supplies the fuel supplier 17 with the coal.

The coal feeder 20 includes the banker 21, a transporter 22, and a motor 23. The transporter 22 uses the drive force imparted from the motor 23 to transport the coal discharged via a lower end portion of a downspout 24, which is located immediately below the banker 21, and guides the coal to the fuel supplier 17 of the pulverizer 10.

In general, the interior or the pulverizer 10 has high pressure because the transport gas for transporting the pulverized coal, which is the crushed coal, is supplied into the pulverizer 10. The fuel is held in the form of a laminate in the downspout 24, which is a tube located immediately below the banker 21 and extending in the upward/downward direction, and the fuel layers laminated in the downspout 24 provide sealing that prevents the transport gas and the pulverized coal in the pulverizer 10 from flowing back into the coal feeder 20.

The amount of coal supplied to the pulverizer 10 may be adjusted by the belt speed of a belt conveyer of the transporter 22.

The blowing section 30 is an apparatus that blows the transport gas, which dries the coal crushed by the rollers 13 (pulverized coal) and supplies the classifier 16 with the coal, into the housing 11.

The blowing section 30 includes a hot gas blower 30*a*, a cool gas blower 30*b*, a hot gas damper (high-temperature drying gas flow rate adjustment damper) 30*c*, and a cool gas damper (low-temperature drying gas flow rate adjustment damper) 30*d* to adjust the temperature of the transport gas to be delivered to the housing 11 to an appropriate temperature. High-temperature air sent by the hot gas blower 30*a* and low-temperature air sent by the cool gas blower 30*b* are mixed with each other, and the mixed air is transported as the transport gas.

The hot gas blower 30*a* is, for example, a blower that sends the heated high-temperature air supplied from a heat exchanger (heater), such as an air preheater. The hot gas damper (first blowing section) 30*c* is provided on the downstream of the hot gas blower 30*a*. The opening of the hot gas damper 30*c* is controlled by the controller 50. The opening of the hot gas damper 30*c* determines the flow rate of the high-temperature air sent by the hot gas blower 30*a*.

The cool gas blower 30*b* is a blower that sends the low-temperature air, which is, for example, outside air at room temperature. The cool gas damper (second blowing section) 30*d* is provided on the downstream of the cool gas blower 30*b*. The opening of the cool gas damper 30*d* is controlled by the controller 50. The opening of the cool gas damper 30*d* determines the flow rate of the low-temperature air sent by the cool gas blower 30*b*.

The flow rate of the transport gas is the sum of the flow rate of the high-temperature air sent by the hot gas blower 30*a* and the flow rate of the low-temperature air sent by the cool gas blower 30*b*. The transport gas, which also serves as a drying fluid, therefore has a high temperature. The flow rate of the transport gas is therefore primarily the flow rate of the high-temperature air sent by the hot gas blower 30*a*. In other words, the flow rate of the transport gas is controlled primarily by the hot gas damper 30*c*. The temperature of the transport gas is determined by the mixture ratio between the transport gas sent by the hot gas blower 30*a* and the transport gas sent by the cool gas blower 30*b* and is controlled by the controller 50. The transport gas, which also serves as a drying fluid, therefore has a high temperature. The temperature of the transport gas is therefore primarily the temperature of the high-temperature air sent by the hot gas blower 30*a* and is adjusted by the flow rate of the low-temperature air sent by the cool gas blower 30*b*. In other words, the temperature of the transport gas is controlled primarily by the cool gas damper 30*d*.

Part of the combustion gas having exited out of the boiler 200 and passed through an environment apparatus, such as an electric dust collector, via a gas recirculation ventilator may be guided to and mixed with the transport gas sent by the hot gas blower 30*a* into a mixture gas to adjust the oxygen concentration of the transport gas flowing via the transport gas channel 100*a*. The method for controlling the flow rate and temperature of the transport gas described above has been presented by way of example. In other words, the method for controlling the flow rate and temperature or the transport gas is not limited to the method described above, and any method is applicable based, for example, on conditions under which a facility to be used operates (temperature of high-temperature air in facility to be used, for example).

In the present embodiment, the air heated by the heat exchanger is used as the high-temperature air, and the outside air is used as the low-temperature air, but not necessarily, as long as a high-temperature fluid and a low-temperature fluid are provided. For example, in an integrated gasification combined cycle 1000, which will be described later, a hot-temperature gas supplied from a heat recovery steam generator 400 (air bleeding from downstream side of desulfurization equipment, for example) may be used as the high-temperature air, and a low-temperature gas supplied from the heat recovery steam generator 400 (air bleeding from space between intermediate-pressure coal economizer and high-pressure coal economizer, for example) may be used as the low-temperature air. The transport gas (drying fluid) is not necessarily produced by mixing a high-temperature fluid and a low-temperature fluid with each other as long as the flow rate and temperature of the transport gas are controllable.

In the present embodiment, the state detector 40 in the housing 11 transmits measured or detected data to the controller 50. The state detector 40 in the present embodiment is, for example, a differential pressure measurement means and measures the difference in pressure between the portion via which the transport gas flows from the transport gas channel 100*a* into the pulverizer 10 and the exit 19, via which the transport gas and the pulverized coal exit from the interior of the pulverizer 10 into the supply channel 100*b*, as the differential pressure in the pulverizer 10. For example, the classification performance of the classifier 16 changes an increase or a decrease in the amount of pulverized coal circulating in the pulverizer 10 and a decrease in increase in the differential pressure in the pulverizer 10 in accordance with the increase or decrease described above. In other words, since the pulverized coal to be discharged via the exit 19 can be adjusted and managed with respect to the coal supplied into the pulverizer 10, a large amount of pulverized coal can be supplied to the burner section 220 provided in the boiler 200 to the extent that the granularity of the pulverized coal does not affect the combustibility in the burner section 220.

The state detector 40 in the present embodiment is, for example, a temperature measurement means and controls the blowing section 30, which sends the transport gas, which supplies the classifier 16 with the coal crushed by the rollers 13, into the housing 11, by detecting the temperature of the transport gas in the housing 11, which is adjusted by the blowing section 30. Since the transport gas is cooled in the housing 11 when transported while drying the crushed coal, the temperature in an upper space in the housing 11 ranges, for example, from about 60 to 90° C.

The boiler 200 includes a furnace 210 and the burner section 220 and combusts the pulverized coal supplied from the solid fuel crusher 100 to produce steam. The combustion gas discharged from the boiler 200 undergoes a predetermined process in the environment apparatus (such as desulfurization equipment and an electric dust collector that are not shown), undergoes heat exchange with the outside air via a heat exchanger, such as an air preheater, is guided to a stack (not shown) via an induced draft fan (not shown), and is discharged into the air. In the heat exchanger, the outside air heated by the heat exchange with the combustion gas is sent to the hot gas blower 30*a* described above. Water supplied to each of the heat exchangers in the boiler 200 is heated by an economizer (net shown) and then further heated by an evaporator (not shown) and a superheater (not shown) to produce high-temperature, high-pressure steam, which is sent to a steam turbine (not shown), which rotates a generator (not shown) to generate power.

The controller 50 is an apparatus that controls each portion of the solid fuel crusher 100. The controller 50 can, for example, control the rotation of the rotary table 12 with respect to the operation of the pulverizer 10 by transmitting a drive instruction to the driver 14. The controller 50 transmits a drive instruction, for example, to the motor 18 of the classifier 16 to control the rotational speed of the motor 18 to adjust the classification performance, whereby the differential pressure in the pulverizer 10 can be optimized to stabilize the supply of the pulverized coal. The controller 50 can transmit a drive instruction, for example, to the motor 23 of the coal feeder 20 to adjust the amount of coal transported and supplied by the transporter 22 to the fuel supplier 17. The controller 50 can transmit an opening instruction to the blowing section 30 to control the openings of the hot gas damper 30*c* and the cool gas damper 30*d* to control the flow rate and temperature of the transport gas.

The controller 50 is formed, for example, of a CPU (central processing unit), RAM (random access memory), ROM (read only memory), and a computer readable storage medium. A series of processes for achieving a variety of functions are stored in the storage medium in the form of a program by way of example, and the CPU reads the program, for example, in the ram and performs information processing and operation to achieve the variety of functions. The program may, for example, be provided in the following forms: the program is installed in advance in the ROM or any other storage medium; the program is provided as a computer readable storage medium in which the program has been stored; and the program is distributed via a wired or wireless communication means. The computer readable storage medium is, for example, a magnetic disk, a magneto-optical disk, CD-ROM, DVD-ROM, and a semiconductor memory.

Figure 2:
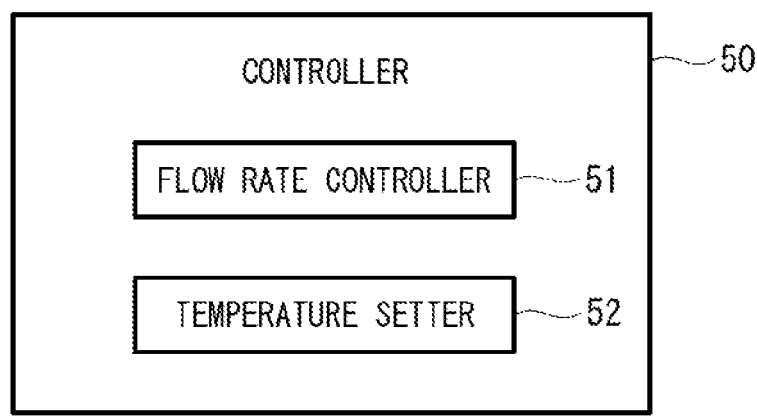
FIG. 2 is a functional block diagram showing functions of a controller according to the first embodiment of the present invention.

FIG. 2 is a functional block diagram showing the functions of the controller 50. The controller (pulverized coal drying system) 50 includes a flow rate controller 51 and a temperature setter 52 as shown in FIG. 2. In the controller 50, the flow rate controller 51 and the temperature setter 52 particularly carry out the process of drying the pulverized coal (process carried out by pulverized coal drying system).

The flow rate controller 51 controls the flow rate of the transport gas in such a way that the temperature of the transport gas discharged from the pulverizer 10 approaches a target temperature within upper and lower limits of the flow rate of the transport gas (drying fluid) set to dry a plurality of types of coal (carbon-containing solid fuel) having different moisture contents. The plurality or types or coal are those classified in terms of moisture content and are planned to be used in the pulverizer 10. For example, the types of coal are classified in terms of the rank of coalification of coal, which is corelated to the moisture content in the coal (such as bituminous coal and subbituminous coal).

Specifically, the flow rate controller 51 acquires a current temperature To of the transport gas discharged from the pulverizer 10 from a thermometer (state detector 40) provided at the exit of the pulverizer 10. The flow rate controller 51 then controls the flow rate of the transport gas in such a way that the acquired temperature To approaches the target temperature. The temperature of the transport gas discharged from the pulverizer 10 is affected by the dryness of the pulverized coal. The amount of heat held by the transport gas is used as part of the heat that vaporizes the moisture in the pulverized coal. Therefore, for example, when the coal to be used has a large moisture content and the crushed pulverized coal therefore also has a large moisture content, a small flow rate of the transport gas lowers the temperature of the transport gas discharged from the pulverizer 10. On the other hand, even when the coal to be used has a large moisture content and the crushed pulverized coal therefore also has a large moisture content, a sufficient flow rate of the transport gas increases the temperature of the transport gas discharged from the pulverizer 10. In other words, the dryness of the pulverized coal correlates to the temperature of the transport gas discharged from the pulverizer 10.

The pulverized coal can therefore be so managed as to be more reliably dried by setting the target temperature to be the temperature of the transport gas discharged from the pulverizer 10, the temperature expected when the dried pulverized coal reaches a desired dryness, and controlling the flow rate of the transport gas in such a way that the temperature of the transport gas discharged from the pulverizer 10 is the target temperature. The target temperature is set, for example, at a temperature ranging from about 60 to 90° C. The desired dryness is a state in which the moisture content in the dried pulverized coal at the exit of the mill is 20% or lower or the dried pulverized coal contains no surface moisture so that recombination of the pulverized coal or particle growth does not occur and hence the pulverized coal is readily transported by the transport gas.

Figure 3:
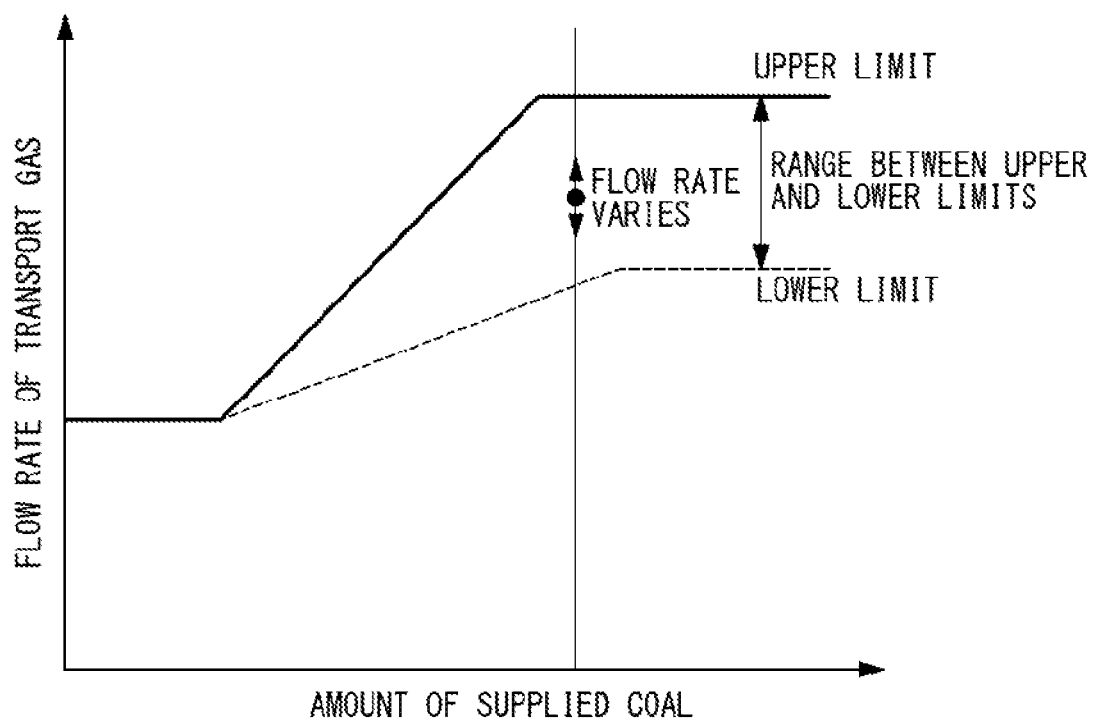
FIG. 3 shows an example of upper and lower limits in the controller according to the first embodiment of the present invention.

The flow rate controller 51 controls the flow rate of the transport gas (drying fluid) within the upper and lower limits or the now rate or the transport gas set to dry the plurality of types of coal having different moisture contents. FIG. 3 shows an example of the upper and lower limits. The upper and lower limits are so set in the state in which the transport gas discharged from the pulverizer 10 has the target temperature with respect to the amount of supplied coal that the flow rate of the transport gas for drying the coal having the maximum moisture content is the upper limit, and the flow rate of the transport gas for drying the coal having the minimum moisture content is the lower limit. The state in which the target temperature is achieved may be replaced with a state in which a predetermined temperature is achieved. The predetermined temperature is the maximum temperature of the suppliable transport gas. In other words, the predetermined temperature is the temperature of the transport gas (maximum temperature) in the case where the hot gas damper 30c is fully open and the cool gas damper 30d is fully closed. A value as a result of subtraction of a predetermined margin from the maximum temperature of the suppliable transport gas may be the predetermined temperature.

In other words, the upper limit is the flow rate of the transport gas for drying coal containing the maximum moisture content out of the plurality of types of coal to be used in the case where the temperature of the suppliable transport gas is maximized, and the lower limit is the now rate or the transport gas for drying coal containing the minimum moisture content out of the plurality of types of coal to be used in the case where the temperature of the suppliable transport gas is maximized. As described above, controlling the flow rate of the transport gas within the upper and lower limits allows any one of the plurality of types of coal to be used to be reliably dried. In the present embodiment, since the transport gas also serves to transport the pulverized coal into the supply channel, the lower limit of the upper and lower limits is set to be greater than or equal to the minimum flow rate that allows transport of the pulverized coal.

The temperature setter 52 lowers the target temperature by the predetermined temperature when the flow rate of the transport gas reaches the upper limit of the upper and lower limits, for example, if the amount of supplied coal increases, and the temperature setter 52 raises the target temperature by the predetermined temperature when the flow rate of the transport gas reaches the lower limit of the upper and lower limits.

The flow rate of the transport gas used to transport the pulverized coal is adjusted by adjusting the openings of the hot gas damper 30c and the cool gas damper 30d, as described above. Therefore, when the now rate or the transport gas reaches the upper or lower limit of the upper and lower limits, the opening of each of the dampers is likely to be close to the limit of the mechanically movable region (small or large opening region). For example, when the flow rate of the transport gas reaches the upper limit of the upper and lower limits, the opening of the hot gas damper 30c falls within the large opening region (90% or higher, for example), and the opening of the cool gas damper 30d falls within the small opening region (smaller than 10%, for example). When the flow rate of the transport gas reaches the lower limit of the upper and lower limits, the opening of the hot gas damper 30c falls within the small opening region, and the opening of the cool gas damper 30d falls within the large opening region. When the opening of each of the dampers is close to the limit of the mechanically movable region, the opening is out of a predetermined range over which the opening of the damper is effectively controlled, so that the flow rate control response needs to be improved.

To this end, the temperature setter 52 changes the target temperature by the predetermined temperature when the flow rate of the transport gas reaches the upper or lower limit of the upper and lower limits to improve the controllability of each of the dampers. Specifically, when the flow rate of the transport gas reaches the upper limit or the upper and lower limits, the target temperature is lowered by the predetermined temperature because the opening of the hot gas damper 30c falls within the large opening region and the opening of the cool gas damper 30d falls within the small opening region. Lowering the target temperature by the predetermined temperature allows the opening of each of the dampers to have a margin with respect to the limit of the mechanically movable region. When the flow rate of the transport gas reaches the lower limit of the upper and lower limits, the target temperature is raised by the predetermined temperature because the opening of the hot gas damper 30c falls within the small opening region and the opening of the cool gas damper 30d falls within the large opening region. Raising the target temperature by the predetermined temperature allows the opening of each of the dampers to have a margin with respect to the limit of the mechanically movable region. The predetermined temperature is the amount of temperature change that still allows a change in the performance of the pulverized coal supplying system to fail within an acceptable range even when the target temperature of the transport gas discharged from the pulverizer 10 is changed multiple times. The predetermined temperature may, for example, be so set as to range from 0.5° C. to 2° C., further preferably, from 0.5° C. to 1° C.

Even when the flow rate of the transport gas reaches the lower limit of the upper and lower limits, the opening of each of the dampers may not be close to the limit of the mechanically movable region. The temperature setter 52 therefore may evaluate whether or not the flow rate of the transport gas has reached the upper or lower limit of the upper and lower limits and further evaluate whether or not the opening of each of the dampers is close to the limit of the mechanically movable region, and the temperature setter 52 may change the target temperature when the results of the two evaluation processes are both affirmative.

Figure 4:
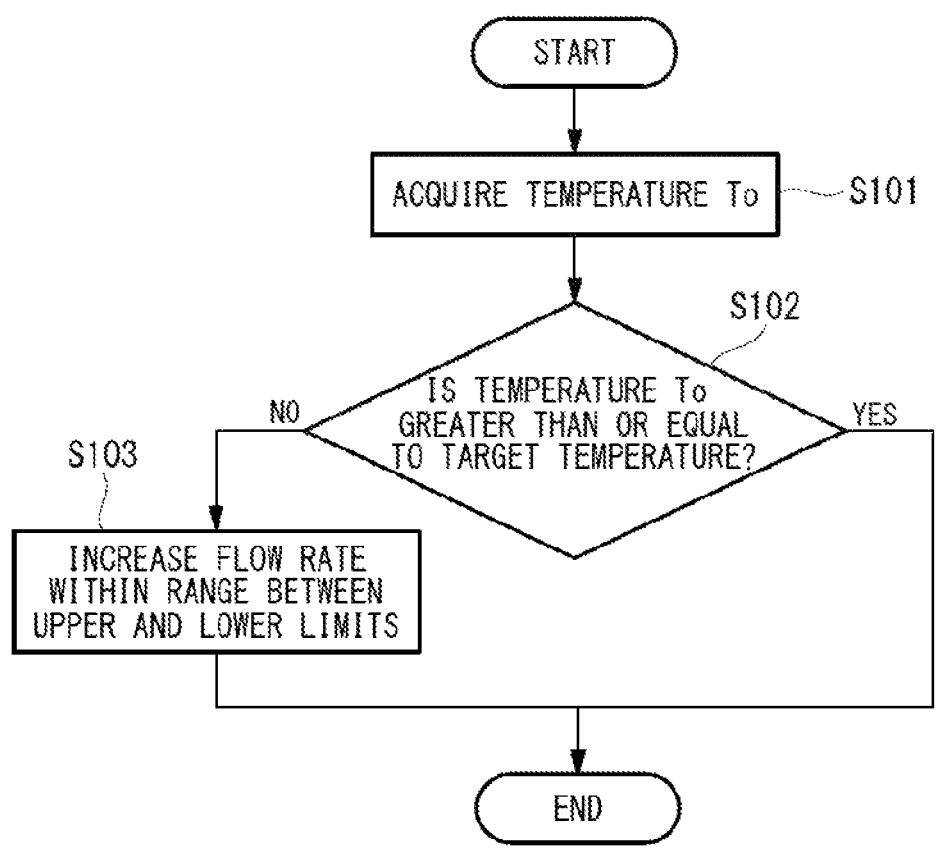
FIG. 4 is a flowchart of a pulverized coal drying process carried out by the controller according to the first embodiment of the present invention.

The aforementioned pulverized coal drying process carried out by the controller 50 will next be described with reference to FIG. 4. The procedure shown in FIG. 4 is repeatedly carried out in a predetermined control cycle when the pulverizer 10 is in operation.

The temperature To of the transport gas (drying fluid) discharged from the pulverizer 10 is first acquired (S101).

It is then evaluated whether or not the temperature To of the transport gas is higher than or equal to the target temperature (S102).

When the temperature To of the transport gas is higher than or equal to the target temperature (YES in evaluation in S102), it can be estimated that the temperature To of the transport gas discharged from the pulverizer 10 is sufficiently high and the pulverized coal has been appropriately dried, the flow rate of the transport gas is not adjusted and the process is terminated (current, setting is maintained).

When the temperature To of the transport gas is not higher than or equal to the target temperature (NO in evaluation in S102), the flow rate of the transport gas is so increased that the temperature To of the transport gas approaches the target temperature within preset upper and lower limits of the flow rate of the transport gas (S103).

Figure 5:
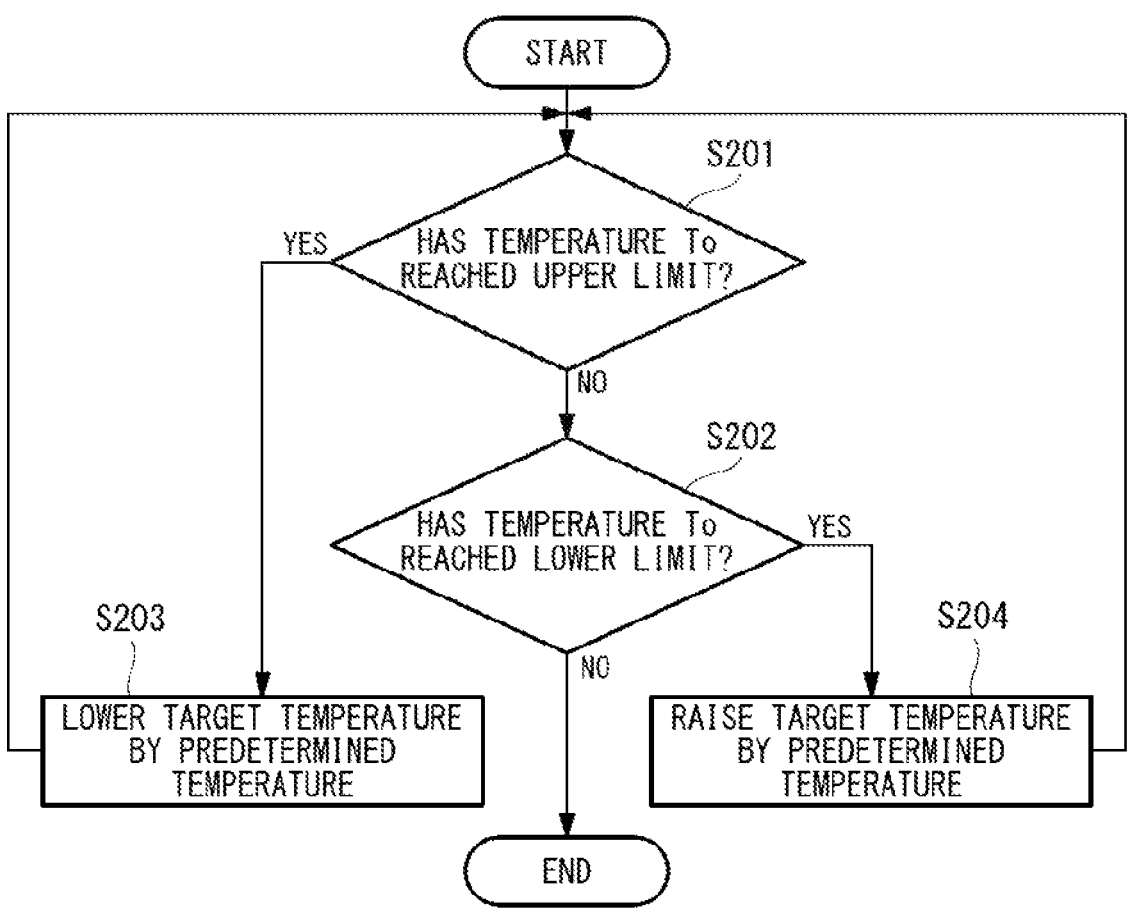
FIG. 5 is a flowchart of a target temperature changing process carried out by the controller according to the first embodiment of the present invention.

The aforementioned target temperature changing process carried out by the controller 50 will next be described with reference to FIG. 5. The procedure shown in FIG. 5 is repeatedly carried out in a predetermined control cycle when the pulverizer 10 is in operation. The set (updated) target temperature is then used in the aforementioned pulverized coal drying process carried out by the controller 50.

It is first evaluated whether or not the flow rate or the transport gas has reached the upper limit of the upper and lower limits (S201).

When the flow rate of the transport gas has not reached the upper limit of the upper and lower limits (NO in evaluation in S201), it is evaluated whether or not the flow rate of the transport gas has reached the lower limit of the upper and lower limits (S202). When the flow rate of the transport gas has not reached the lower limit of the upper and lower limits (NO in evaluation in S202), it is estimated that the flow rate of the transport gas has a margin with respect to the upper or lower limit, and the process is terminated.

When the flow rate of the transport gas has reached the upper limit of the upper and lower limits (YES in evaluation in S201), the target temperature is lowered by the predetermined temperature (S203), and the control returns to S201.

When the flow rate of the transport gas has reached the lower limit of the upper and lower limits (YES in evaluation in S202), the target temperature is raised by the predetermined temperature (S204), and the control returns to S201.

Figure 6:
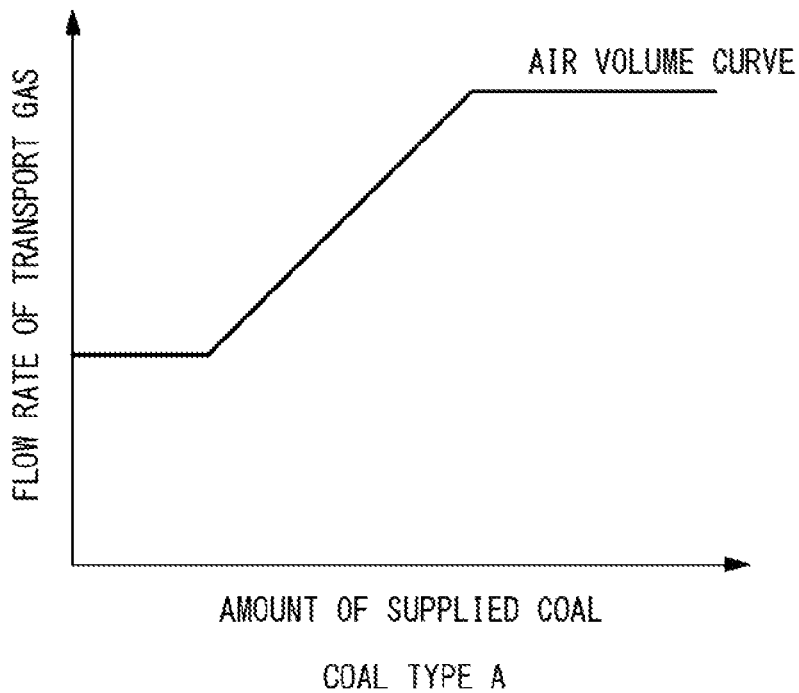
FIG. 6 shows an example of an air volume curve in comparative Example.
Figure 7:
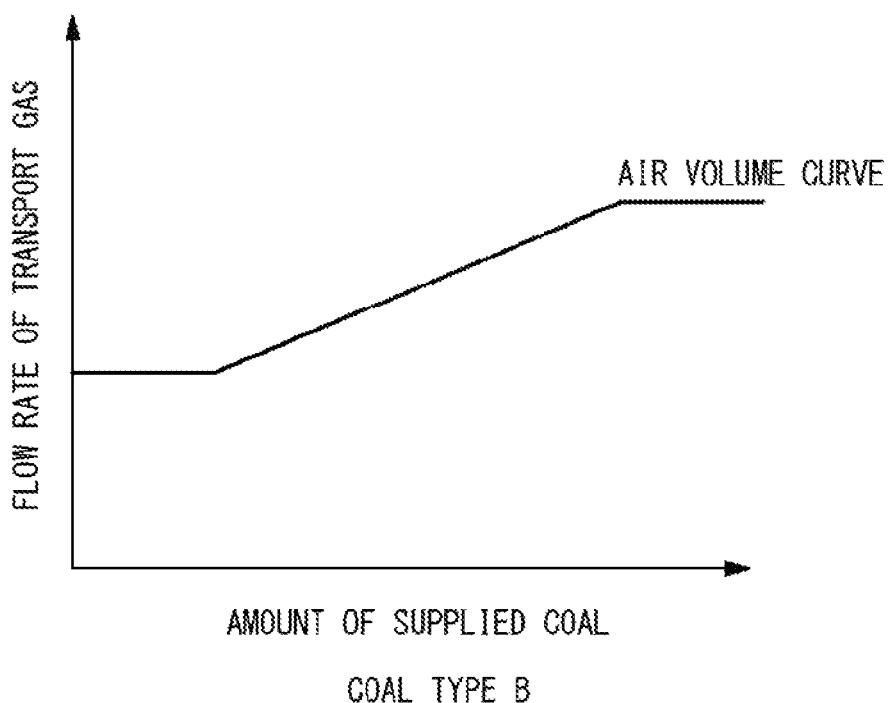
FIG. 7 shows another example of the air volume curve in Comparative Example.

As described above, the pulverized coal drying system for the pulverizer, the pulverized coal drying method therefor, the pulverized coal drying program, and the pulverizer according to the present embodiment set the upper and lower limits of the flow rate of the transport gas in such a way that a plurality of types of coal can be dried and control the flow rate of the transport gas within the upper and lower limits in such a way that the temperature of the transport gas discharged from the pulverizer 10 approaches the target temperature, whereby the plurality of types of coal can be handled. In the related art, data, for example, on the air volume curve needs to be prepared on a coal type basis, as shown in FIGS. 6 and 7. FIG. 6 shows an air volume curve corresponding to a coal type A, and FIG. 7 shows an air volume curve corresponding to a coal type B. In other words, an air volume curve needs to be appropriately selected or otherwise achieved, for example, by an operator in accordance with the type of the coal to be used. However, the upper and lower limits of the flow rate of the transport gas are so set that a plurality of types of coal can be dried in accordance with the amount of supplied coal, and the flow rate of the transport gas is controlled within the upper and lower limits in such a way that the temperature of the transport gas discharged from the pulveriser 10 approaches the target temperature, whereby occurrence of a human error at the time or switching the type of coal can be suppressed, so that the data selection burden on the operator can be reduced.

Since the upper and lower limits of the flow rate of the transport gas can be appropriately set in correspondence with the plurality of types of coal to be used, the flow rate of the transport gas for the plurality of types of coal can be appropriately set.

When the flow rate of the transport gas reaches the upper limit, the target temperature of the transport gas is lowered by the predetermined temperature, and when the flow rate of the transport gas reaches the lower limit, the target temperature of the transport gas is raised by the predetermined temperature, whereby a decrease in response of the flow rate of the transport gas can be suppressed. For example, when the flow rate of the transport gas reaches the upper limit, the mechanism that adjusts the flow rate of the transport gas operates in some cases in the state in which the limit of the operable region of the mechanism has been almost reached (valve is fully open, for example). In such a case, the flow rate control response needs to be improved. A necessary flow rate of the transport gas can be reduced by lowering the target temperature, whereby the mechanism that adjusts the flow rate or the transport gas is allowed to operate with a margin. The response of the flow rate of the transport gas can therefore be improved.

The present embodiment has been described with reference to the case where the classifier 16 is a rotation-type classifier, but not necessarily, and the classifier 16 can be a fixed-type classifier (cyclone separator) or the combination of a rotation-type classifier and a fixed-type classifier.

Second Embodiment

A pulverized coal drying system for a pulverizer, a pulverized coal drying method therefor, a pulverized coal drying program, a pulverizer, and an integrated gasification combined cycle according to a second embodiment of the present invention will next be described.

The aforementioned first embodiment has been described with reference to the case where the solid fuel crusher 100 is used in a coal fired power generation plant (turbine is rotated by steam produced by combusting fuel), whereas the present embodiment will be described with reference to a case where the solid fuel crusher 100 is used in an integrated gasification combined cycle (IGCC) 1000. The pulverized coal drying system for a pulverizer, the pulverized coal drying method therefor, the pulverized coal drying program, the pulverizer, and the integrated gasification combined cycle according to the present embodiment will be described below primarily on points different from those in the first embodiment.

The configuration of the integrated gasification combined cycle (IGCC) 1000 will first be described.

Figure 8:
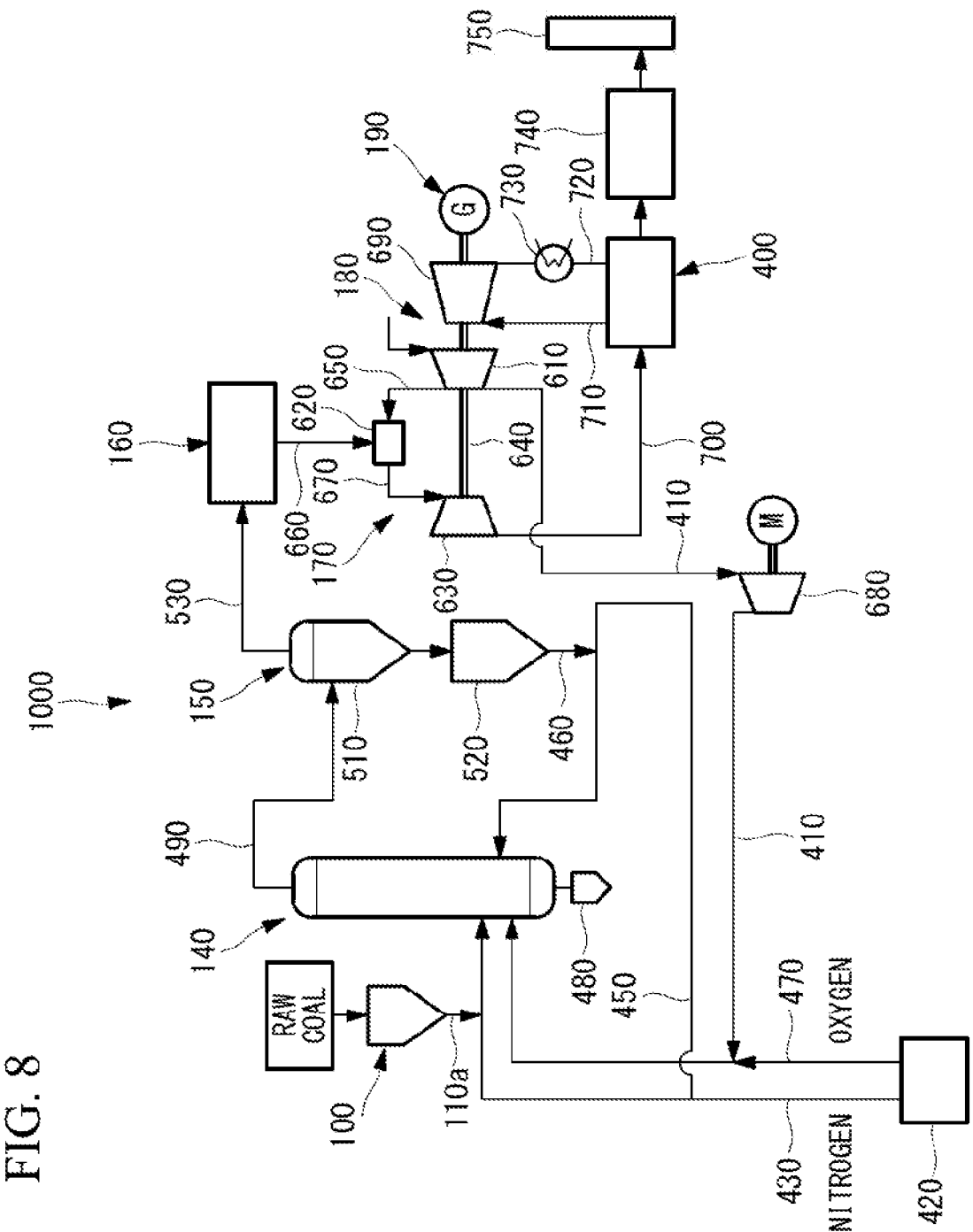
FIG. 8 is a schematic configuration of an integrated gasification combined cycle according to a second embodiment of the present invention.

FIG. 8 is a schematic configuration diagram of the integrated gasification combined cycle 1000.

In the following description, the positional relationship among the components having been described by using the "upward" and "downward" expression represents the upper side and lower side in the vertical direction, respectively.

The integrated gasification combined cycle (IGCC) 1000 using a gasification unit 140 uses an oxidizer primarily containing air, and the gasification unit 140 employs an air combustion scheme for producing a combustible gas (raw syngas) from a fuel. In the integrated gasification combined cycle 1000, a gas clean-up unit 160 purifies the raw syngas generated in the gasification unit 140 into a fuel gas, which is then supplied to a gas turbine 170 for power generation. In other words, the integrated gasification combined cycle 1000 according to the first embodiment is an air combustion (air blowing) power generation facility. The fuel supplied to the gasification unit 140 is, for example, a carbon-containing solid fuel, such as coal.

The integrated gasification combined cycle (gasification combined cycle) 1000 includes the solid fuel crusher (coal feeding unit) 100, the gasification unit 140, a char recovery unit 150, the gas clean-up unit 160, the gas turbine 170, a steam turbine 180, a generator 190, and a heat recovery steam generator (HRSG) 400, as shown in FIG. 8.

The solid fuel crusher 100, to which coal, which is a carbon-containing solid fuel, is supplied as raw coal, crushes the coal in the pulverizer 10 or any other facility to manufacture pulverized coal, which is crushed coal in the form of fine particles. The pulverized coal manufactured by the solid fuel crusher 100 is pressurized by a nitrogen gas as a transport inert gas supplied from an air separation unit 420, which will be described later, at the exit of a coal feed line 110*a* and supplied toward the gasification unit 140. The inert gas is a gas that is inert and has an oxygen content of about 5 volume % or less. A nitrogen gas, a carbon dioxide gas, an argon gas, and the like are representative examples of the inert gas, but the oxygen content is not necessarily limited to about 5 volume % or less.

The gasification unit 140 receives the pulverized coal manufactured by the solid fuel crusher 100 and further receives char recovered by the char recovery unit 150 (unreacted component and ash component of coal) for reuse purposes.

A compressed air supply line 410 from the gas turbine 170 (compressor 610) is connected to the gasification unit 140. The pressure of part of the compressed air compressed by the gas turbine 170 is boosted by a pressure booster 680 to predetermined pressure, and the resultant pressurized air can be supplied to the gasification unit 140. The air separation unit 420 separates and produces nitrogen and oxygen from the air in the atmosphere, and the air separation unit 420 is connected to the gasification unit 140 via a first nitrogen supply line 430. The coal feed line 110*a* from the solid fuel crusher 100 is connected to the first nitrogen supply line 430. A second nitrogen supply line 450, which branches off the first nitrogen supply line 430, is also connected to the gasification unit 140, and a char return line 460 from the char recovery unit 150 is connected to the second nitrogen supply line 450. Further, the air separation unit 420 is connected to the compressed air supply line 410 via an oxygen supply line 470. The nitrogen separated by the air separation unit 420 flows through the first nitrogen supply line 430 and the second nitrogen supply line 450 and is therefore used as the transport gas that transports the coal and char. The oxygen separated by the air separation unit 420 flows through the oxygen supply line 470 and the compressed air supply line 410 and is therefore used as the oxidizer in the gasification unit 140.

Figure 9:
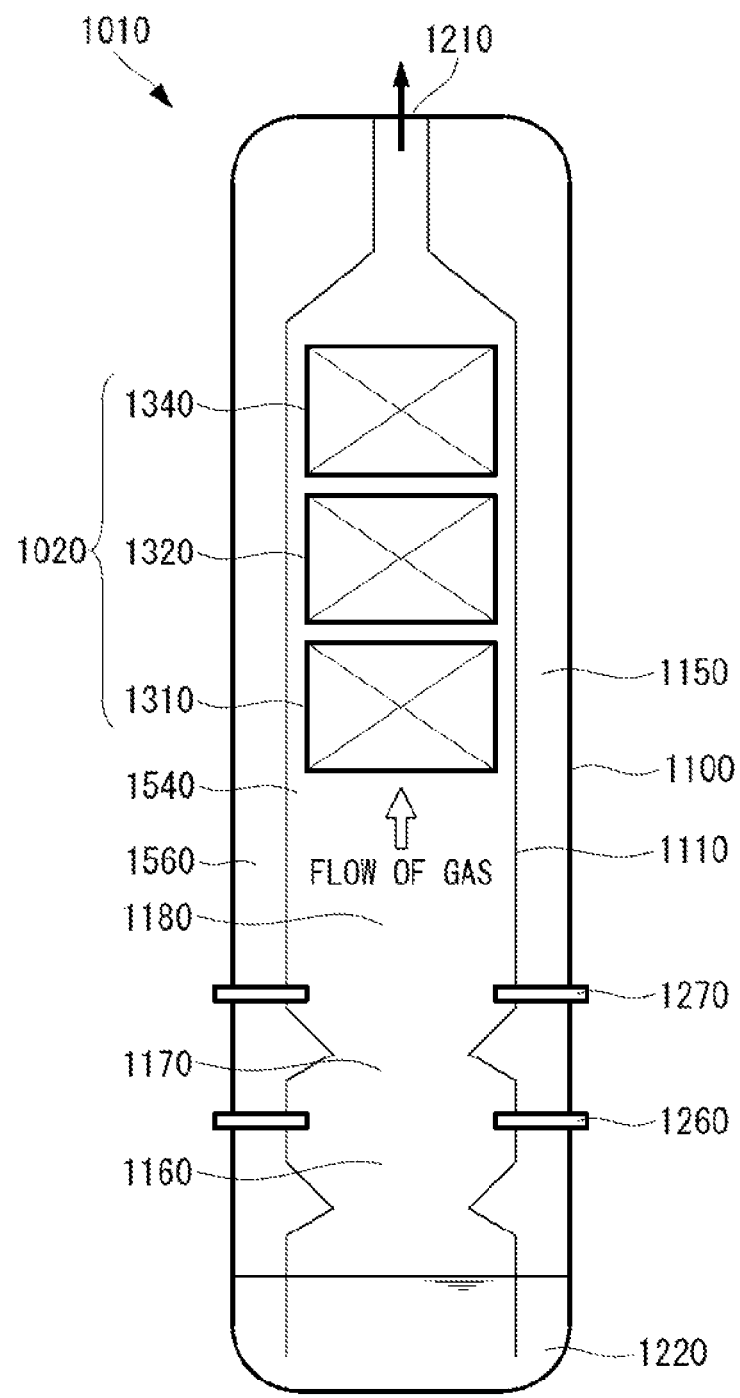
FIG. 9 is a schematic configuration diagram showing a gasification unit in FIG. 8.

The gasification unit 140 includes, for example, a two-stage-entrained-bed-type gasifier 1010 (see FIG. 9). The gasification unit 140 partially combusts the coal (pulverized coal) and the char supplied thereto with the aid of the oxidizer (air, oxygen) to gasify the coal and char into a generated gas. The gasification unit 140 is provided with a foreign matter removal unit 430, which removes foreign matter (slag) having contaminated the pulverized coal. A gas generation line 490, via which the generated gas is supplied toward the char recovery unit 150, is connected to the gasification unit 140, and the generated gas containing the char can be discharged via the gas generation line 490. In this case, a syngas cooler 1020 (gas cooler) may be provided in the gas generation line 490 to cool the generated gas to a predetermined temperature, and the cooled generated gas may be supplied to the char recovery unit 150, as shown in FIG. 9.

The char recovery unit 150 includes a dust precipitation unit 510 and a supply hopper 520. In this case, the dust precipitation unit 510 is formed or one or more cyclone or porous filters and can separate the char contained in the generated gas generated by the gasification unit 140. The generated gas from which the char has been separated is sent to the gas clean-up unit 160 via a gas discharge line 530. The supply hopper 520 stores the char separated from the generated gas by the Dust precipitation unit 510. A bin may be disposed between the dust precipitation unit 510 and the supply hopper 520, and a plurality of supply hoppers 520 may be connected to the bin. The char return line 460 from the supply hopper 520 is connected to the second nitrogen supply line 450.

The gas clean-up unit 160 removes impurities, such as sulfur compounds and nitrogen compounds, from the generated gas from which the char has been separated by the char recovery unit 150 to purify the gas. The gas clean-up unit 160 purifies the generated gas to manufacture a fuel gas, which is supplied to the gas turbine 170. Since the generated gas from which the char has been separated still contains sulfur component (such as $H_2S$), the gas clean-up unit 160 removes and recovers the sulfur component by using, for example, an amine absorption liquid and effectively uses the recovered sulfur component.

The gas turbine 170 includes a compressor 610, a combustor 620, and a turbine 630, and the compressor 610 and the turbine 630 are linked to each other via a rotary shaft 640. A compressed air supply line 650 from the compressor 610 is connected to the combustor 620, a fuel gas supply line 660 from the gas clean-up unit 160 is also connected to the combustor 620, and a combustion gas supply line 670, which extends toward the turbine 630, is also connected to the combustor 620. The gas turbine 170 is provided with the compressed air supply line 410, which extends from the compressor 610 to the gasification unit 140, and the pressure booster 680 is provided at the middle of the compressed air supply line 410. The combustor 620 therefore mixes part of the compressed air supplied from the compressor 610 with at least part of the fuel gas supplied from the gas clean-up unit 160, combusts the mixture gas to generate a combustion gas, and supplies the generated combustion gas toward the turbine 630. The turbine 630 then uses the supplied combustion gas to rotate the rotary shaft 640 to rotate the generator 190.

The steam turbine 180 includes a turbine 690, which is linked to the rotary shaft 640 of the gas turbine 170, and the generator 190 is linked to the base end of the rotary shaft 640. An exhaust gas line 700 from the gas turbine 170 (turbine 630) is connected to the heat recovery steam generator 400, and water red to the heat recovery steam generator 400 and the exhaust gas from the turbine 630 exchange heat with respect to each other to generate steam. The heat recovery steam generator 400 is provided with a steam supply line 710 and a steam recovery line 720 between the heat recovery steam generator 400 and the turbine 690 of the steam turbine 180, and the steam recovery line 720 is provided with a condenser 730. The steam generated by the heat recovery steam generator 400 may contain the steam generated by the heat exchange with the generated gas in the syngas cooler 1020 of the gasifier 1010. Therefore, in the steam turbine 180, the steam supplied from the heat recovery steam generator 400 rotates the turbine 690, which rotates the rotary shaft 640 to rotate the generator 190.

A gas cleaning unit 740 is provided in the path from the exit of the heat recovery steam generator 400 to a stack 750.

The operation of the integrated gasification combined cycle 1000 according to the present embodiment will now be described.

In the integrated gasification combined cycle 1000 according to the present embodiment, when raw coal (coal) is supplied to the solid fuel crusher 100, the coal is crushed by the solid fuel crusher 100 into fine particles to form the pulverized coal. The pulverized coal manufactured by the solid fuel crusher 100 flows through the first nitrogen supply line 430 with the aid of the nitrogen supplied from the air separation unit 420 and is supplied to the gasification unit 140. The char recovered by the char recovery unit 150, which will be described later, flows through the second nitrogen supply line 450 with the aid of the nitrogen supplied from the air separation unit 420 and is supplied to the gasification unit 140. Further, the pressure of the compressed air bleeding from the gas turbine 170, which will be described later, is boosted by the pressure booster 680, and the boosted compressed air is then supplied along with the oxygen supplied from the air separation unit 420 to the gasification unit 140 via the compressed air supply line 410.

In the gasification unit 140, the supplied pulverized coal and char combust with the aid of the compressed air (oxygen) and are therefore gasified into the generated gas. The generated gas is then discharged from the gasification unit 140 via the gas generation line 490 and sent to the char recovery unit 150.

In the Char recovery unit 150, the generated gas is first supplied to the Dust precipitation unit 510, which separates fine particulate char contained in the generated gas. The generated gas from which the char has been separated is sent to the gas clean-up unit 160 via the gas discharge line 530. On the other hand, the fine particulate char separated from the generated gas is deposited in the supply hopper 520, returns to the gasification unit 140 via the char return line 460, and is recycled.

The gas clean-up unit 160 removes impurities, such as sulfur compounds and nitrogen compounds, from the generated gas from which the char has been separated by the char recovery unit 150 to purify the gas. The fuel gas is thus manufactured. The compressor 610 generates compressed air and supplies the combustor 620 with the compressed air. The combustor 620 mixes the compressed air supplied from the compressor 610 with the fuel gas supplied from the gas clean-up unit 160 and combusts the mixture to generate the combustion gas. The combustion gas rotates the turbine 630, which rotates the compressor 610 and the generator 190 via the rotary shaft 640. The gas turbine 170 can thus generate power.

The heat recovery steam generator 400 then performs heat exchange between the exhaust gas exhausted from the turbine 630 in the gas turbine 170 and the water fed to the heat recovery steam generator 400 to generate steam and supplies the steam turbine 180 with the generated steam. In the steam turbine 180, the steam supplied from the heat recovery steam generator 400 rotates the turbine 690, which can rotate the generator 190 via the rotary shaft 640 to generate power.

The gas turbine 170 and the steam turbine 180 may not be arranged along a single axis to rotate the generator 190 and may be arranged along separate axes to rotate a plurality of generators.

Thereafter, in the gas cleaning unit 740, toxic substances are removed from the exhaust gas discharged from the heat recovery steam generator 400, and the cleaned exhaust gas is discharged into the atmosphere via the stack 750.

The gasification unit 140 in the integrated gasification combined cycle 1000 will next be described in detail with reference to FIGS. 8 and 9. FIG. 9 is a schematic configuration diagram showing the gasification unit in FIG. 8.

The gasification unit 140 includes the gasifier 1010 and the syngas cooler 1020, as shown in FIG. 9.

In the gasifier 1010, which is so formed as to extend in the vertical direction, the pulverized coal and oxygen are supplied to the lower side in the vertical direction, and the generated gas gasified as a result of the partial combustion of the pulverized coal and oxygen flows from below to above in the vertical direction. The gasifier 1010 includes a pressure vessel 1100 and a gasification furnace wall (furnace wall) 1110 provided in the pressure vessel 1100. In the gasifier 1010, an annulus 1150 is formed in the space between the pressure vessel 1100 and the gasification furnace wall 1110. In the internal space inside the gasification furnace wall 1110 of gasifier 1010, a combustor section 1160, a diffuser section 1170, and a reductor section 1180 are formed sequentially from below in the vertical direction (that is, upstream of generated gas flowing direction).

The pressure vessel 1100, which has a tubular shape having an internal hollow space, has a gas discharge port 1210 formed at the upper end and a slag hopper 1220 formed at the lower end (bottom). The gasification furnace wall 1110 has a tubular shape having an internal hollow space, and the wall surface of the gasification furnace wall 1110 faces the internal surface of the pressure vessel 1100. In the present embodiment, the pressure vessel 1100 has a cylindrical shape, and the diffuser section 1170 of the gasification furnace wall 1110 also has a cylindrical shape. The gasification furnace wall 1110 is linked to the internal surface of the pressure vessel 1100 via a support member that is not shown.

The gasification furnace wall 1110 separates the interior of the pressure vessel 1100 into an internal space 1540 and an external space 1560. The gasification furnace wall 1110 is so shaped that the lateral cross-sectional shape thereof changes in the diffuser section 1170 between the combustor section 1160 and the reductor section 1180, as will be described later. An upper end of the gasification furnace wall 1110 that is an end on the upper side of the vertical direction is connected to the gas discharge port 1210 of the pressure vessel 1100, and a lower end of the gasification furnace wall 1110 that is an end on the lower side of the vertical direction is so provided as to be separate from the bottom of the pressure vessel 1100. Water is stored in the slag hopper 1220, which is formed at the bottom of the pressure vessel 1100, and the configuration in which a lower end portion of the gasification furnace wall 1110 is immersed in the stored water seals the interior and exterior of the gasification furnace wall 1110. Burners 1260 and 1270 are inserted through the gasification furnace wall 1110, and the syngas cooler 1020 is disposed in the internal space 1540. The structure of the gasification furnace wall 1110 will be described later.

The annulus 1150 is the space formed inside the pressure vessel 1100 but outside the gasification furnace wall 1110, that is, the external space 1560, and the nitrogen that is an inert gas and separated by the air separation unit 420 is supplied via a nitrogen supply line that is not shown. The annulus 1150 is therefore a space filled with the nitrogen. An in-furnace uniform pressure tube that is not shown but is intended to achieve uniform pressure in the gasifier 1010 is provided in the vicinity of an upper portion of the annulus 1150 in the vertical direction. The in-furnace uniform pressure tube is so provided as to communicate with the interior and exterior of the gasification furnace wall 1110 and achieves roughly uniform pressure in the gasifier 1010 in such a way that the difference in pressure between the interior of the gasification furnace wall 1110 (combustor section 1160, diffuser section 1170, and reductor section 1180) and the exterior of the gasification furnace wall 1110 (annulus 1150) is smaller than or equal to a predetermined value.

The combustor section 1160 is a space where the pulverized coal and char are partially combusted with the air, and a combustion device formed of a plurality of burners 1260 is disposed at the gasification furnace wall 1110 in the combustor section 1160. The high-temperature combustion gas as a result of the partial combustion of the pulverized coal and char in the combustor section 1160 passes through the diffuser section 1170 and flows into the reductor section 1180.

The reductor section 1180 is a space which is maintained at a high temperature necessary for the gasification reaction and where the pulverized coal is supplied to the combustion gas from the combustor section 1160 to cause the pulverized coal to partially combust so that the pulverized coal is decomposed into volatile components (such as carbon monoxide, hydrogen, and lower hydrocarbon) and gasified into the generated gas, and the combustion device formed of a plurality of burners 1270 is disposed at the gasification furnace wall 1110 in the reductor section 1180.

The syngas cooler 1020 is provided in the space inside the gasification furnace wall 1110 and vertically above the burners 1270 in the reductor section 1180. The syngas cooler 1020 is a heat exchanger, and an evaporator 1310, a superheater 1320, and an economizer 1340 are sequentially arranged in the syngas cooler 1020 from below (upstream of generated gas flowing direction) in the vertical direction of the gasification furnace wall 1110. The thus configured syngas cooler 1020 cools the generated gas generated in the reductor section 1180 with the aid of heat exchange with the generated gas. The numbers or evaporators 1310, superheaters 1320, and economizers 1340 are not limited to those shown in FIG. 9.

The operation of the gasification unit 140 described above will now be described.

In the gasifier 1010 of the gasification unit 140, the burners 1270 in the reductor section 1180 ignite the loaded nitrogen and pulverized coal, and the burners 1260 in the combustor section 1160 ignite the loaded pulverized coal, char, and compressed air (oxygen). The combustor section 1160 then generates a high-temperature combustion gas as a result of the combustion of the pulverized coal and char. In the combustor section 1160, the combustion of the pulverized coal and char generates melted slag in the high-temperature gas, and the melted slag adheres to the gasification furnace wall 1110, drops to the bottom of the furnace, and is eventually discharged into the water stored in the slag hopper 1220. The high-temperature combustion gas generated in the combustor section 1160 then passes through the diffuser section 1170 and rises to the reductor section 1130. In the redactor section 1180, in which a high temperature necessary for the gasification reaction is maintained, the pulverized coal is mixed with the high-temperature combustion gas and partially combusted in the high-temperature reductive atmosphere to undergo the gasification reaction. The generated gas is thus generated. The gasified generated gas flows from below to above in the vertical direction.

Figure 10:
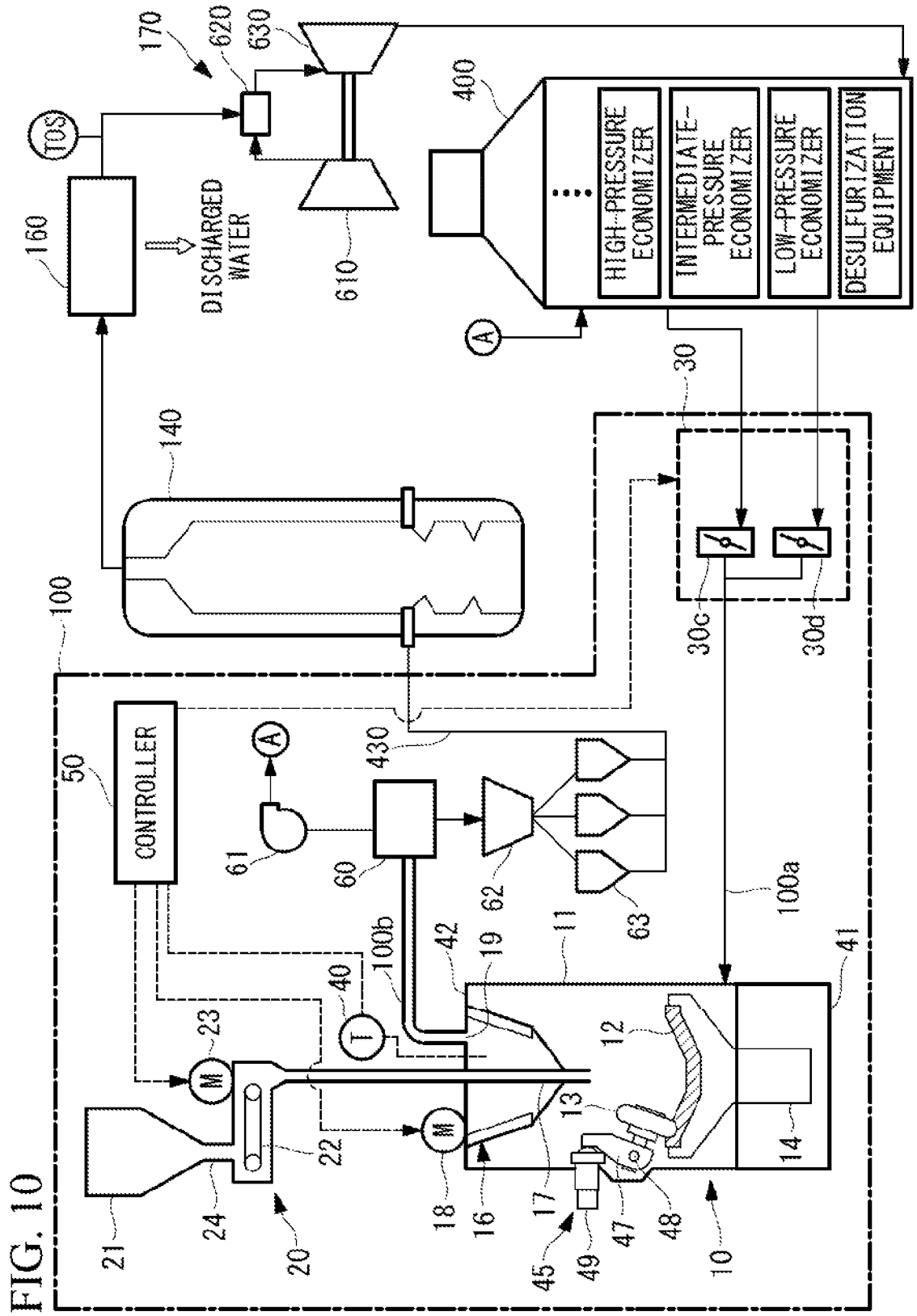
FIG. 10 shows a schematic configuration of a power generation plant according to the second embodiment of the present invention.

FIG. 10 shows a schematic configuration of the solid fuel crusher 100 in the integrated gasification combined cycle 1000 in the present embodiment. FIG. 10 shows a simplified configuration of peripheral apparatuses of the solid fuel crusher 100 that are shown in FIG. 8. FIG. 10 shows the solid fuel crusher 100, the gasification unit 140, the gas clean-up unit 160, the gas turbine 170, and the heat recovery steam generator 400.

In the solid fuel crusher 100 in the present embodiment, the pulverized coal classified by the classifier 16 is discharged into the supply channel 100b via the exit 19 along with the transport gas. The discharged pulverized coal is supplied to a pulverized coal dust precipitator 60. The pulverized coal dust precipitator 60 separates gas components of the transport gas and the like and the pulverized coal (particulate component) from each other. The components of the transport gas and the like are forcibly sent by a blower 61, supplied to the heat recovery steam generator 400, and discharged via the stack 750. On the other hand, the pulverized coal (particulate component) is supplied to a bin 62 and hoppers 63. The recovered pulverized coal in the hoppers 63 flows through the first nitrogen supply line 430 with the aid of the nitrogen supplied from the air separation unit 420 and is supplied to the gasification unit 140.

The gasification unit 140 receives the pulverized coal manufactured by the solid fuel crusher 100 and further receives the char recovered by the char recovery unit 150 (unreacted component and ash component of coal) for reuse purposes. The gasification unit 140 includes, for example, a two-stage-entrained-bed-type gasification furnace. The gasification unit 140 partially combusts the coal (pulverized coal) and the char supplied thereinto with the aid of the oxidizer (air, oxygen) to gasify the coal and char into the generated gas. The gasification furnace unit is provided with the foreign matter removal unit 480, which removes foreign matter (slag) having contaminated the pulverized coal. The generated gas containing the char is discharged from the gasification furnace unit, and the char is separated by the char recovery unit 150. The generated gas from which the char has been separated is sent to the gas clean-up unit 160.

The gas clean-up unit 160 removes impurities, such as sulfur compounds (S component), from the generated gas from which the char has been separated by the char recovery unit 150 to purify the gas. The gas clean-up unit 160 purifies the generated gas to manufacture the fuel gas, which is supplied to the gas turbine 170.

Specifically, the gas clean-up unit 160 includes a converter (not shown) and an absorber (not shown). The converter converts carbonyl sulfide (hereinafter referred to as "COS") in the generated gas into hydrogen sulfide (hereinafter referred to as "$H_2S$") to remove the sulfide component (S component) contained in the generated gas. The converter performs the conversion of COS (carbonyl sulfide)+$H_2O$ (water)→$H_2S$ (hydrogen sulfide)+$CO_2$ (carbon dioxide) by using, for example, a γ-alumina catalyst. In other words, COS contained in the generated gas supplied to the converter is converted into $H_2S$.

The generated gas having undergone the conversion in the converter is supplied to the absorber. The absorber recovers $H_2S$ from the generated gas to remove the sulfur content contained in the generated gas. The absorber also recovers the moisture contained in the generated gas as a raw material to be converted into $H_2S$ and discharges the recovered moisture via a discharged water processing apparatus. A measurement apparatus that measures the total content of COS and $H_2S$ contained in the generated gas (total sulfur: TOS) is provided at the exit or the gas clean-up unit 160. In the gas clean-up unit 160, since the absorber recovers $H_2S$, the sulfur content contained in the generated gas discharged from the gas clean-up unit 160 is roughly equal to the COS content that has not been converted by the converter. In other words, measurement of the total sulfur (TOS) with the measurement apparatus allows estimation of the amount of reduction in COS in the generated gas discharged from the gas clean-up unit 160 with respect to COS contained in the generated gas supplied to the gas clean-up unit 160, whereby the ratio of the conversion from CCS into $H_2S$ can also be estimated. COS in the generated gas supplied to the gas clean-up unit 160 can be checked, for example, with a generated gas analyzer (not shown) disposed at the entrance of the gas purification unit.

In the blowing section 30 in the present embodiment, the high-temperature gas on the upstream of the heat recovery steam generator 400 (downstream of desulfurization equipment) is supplied to the hot gas damper 30c (first blower). The flow rate of the supplied high-temperature gas is controlled by the opening of the hot gas damper 30c (first blower). The heat recovery steam generator 400 is formed, for example, of a high-pressure economizer, an intermediate-pressure economizer, a low-pressure economizer, and desulfurization equipment. The locations from which the high-temperature gas and the low-temperature gas bleed are not limited those described above.

The low-temperature gas on the downstream of the heat recovery steam generator 400 (between the intermediate-pressure economizer and the high-pressure economizer, for example) is supplied to the cool gas damper 30d (second blower). The flow rate of the supplied low-temperature gas is controlled by the opening of the cool gas damper 30d (second blower). The source from which the high-temperature fluid is supplied to the hot gas damper 30c and the source from which the low-temperature fluid is supplied to the cool gas damper 30d are not limited to those described above and can be designed as appropriate.

As an example, the flow rate of the transport gas is primarily determined by the flow rate of the high-temperature gas controlled by the hot gas damper 30c. The transport gas is then determined by the mixture ratio between the high-temperature gas and the low-temperature gas and adjusted particularly by the flow rate of the low-temperature gas controlled by the cool gas damper 30d.

The controller 50 in the present embodiment changes the target temperature of the temperature of the transport gas discharged from the pulverizer 10 in consideration of the process in the gas clean-up unit 160.

The temperature setter 52 changes the target temperature in such a way that the conversion ratio at which carbonyl sulfide is converted into hydrogen sulfide in the generated gas generated when the pulverized coal is partially combusted into a gas in the gasification unit 140 approaches a predetermined reference conversion ratio. Specifically, the gas clean-up unit 160 is provided with the converter on the upstream of the absorber so that the sulfur component in the generated gas can be recovered as $H_2S$ by the absorber. The converter converts the carbonyl sulfide (COS) in the generated gas into hydrogen sulfide ($H_2S$) (COS+$H_2O$→$H_2S$+$CO_2$). The ratio of the conversion from COS into $H_2S$ ($H_2S$ conversion ratio), however, results from the moisture ($H_2O$) content in the generated gas. The moisture content in the generated gas depends on the dryness of the pulverized coal (moisture content). Since the $H_2S$ conversion ratio varies in accordance with the characteristics of the generated gas, the conversion ratio is evaluated by ensuring that the amount of sulfur component in a purified gas at the exit of a desulfurization unit that is not shown is smaller than a limit. The limitation of the amount of sulfur component in the purified gas at the exit of the desulfurization unit varies in accordance, for example, with a plant site law.

In other words, to effectively remove the sulfur component in the generated gas in the gas clean-up unit 160, it is necessary to improve the ratio of the conversion from COS to $H_2S$. To this end, the pulverized coal needs to contain moisture to some extent. The temperature setter 52 therefore adjusts the dryness of the pulverized coal by changing the target temperature to control the ratio of the conversion from COS to $H_2S$.

The temperature setter 52 acquires from the measurement apparatus the sulfur component TOS contained in the generated gas discharged from the gas clean-up unit 160 and estimates the ratio of the conversion from COS to $H_2S$ based on TOS. The temperature setter 52 then changes the target temperature in such a way that the conversion ratio approaches (coincides with) the reference conversion ratio. The reference conversion ratio is determined, for example, by the amount of acceptable sulfur component contained in the generated gas discharged from the gas clean-up unit 160 and set, for example, by an operator of the integrated gasification combined cycle 1000.

Since the temperature setter 52 updates the target temperature of the transport gas discharged from the pulverizer 10 in consideration or the moisture ($H_2O$) content in the necessary generated gas based on the ratio of the conversion from COS to $H_2S$, the gas clean-up unit 160 can more reliably remove the sulfur component in the generated gas.

The temperature setter 52 changes the target temperature of the transport gas discharged from the pulverizer 10 in consideration of the moisture ($H_2O$) content in the necessary generated gas in the generated gas generated when the pulverized coal is partially combusted into a gas based on the flow rate of discharged water recovered from the generated gas. The gas clean-up unit 160 also recovers the moisture contained in the generated gas as a raw material to be converted into $H_2S$ and discharges the recovered moisture, for example, via a discharged water processing unit. When the flow rate of the discharged water is high, however, the flow rate of the discharged water can exceed the acceptable amount of the discharged water processing unit, or the burden on the environment can increase.

The flow rate of the discharged water results from the moisture content in the generated gas, and the moisture content in the generated gas depends on the dryness (water content) of the pulverized coal. In view of the fact described above, the temperature setter 52 adjusts the dryness or the pulverized coal by changing the target temperature or the transport gas discharged from the pulverizer 10 to control the flow rate of the discharged water.

The temperature setter 52 acquires the flow rate of the discharged water from a measurement apparatus and changes the target temperature in such a way that the flow rate of the discharged water approaches (coincides with) a reference flow rate of the discharged water. The reference flow rate of the discharged water is determined, for example, by the acceptable amount of the discharged water processing unit and set, for example, by the operator of the integrated gasification combined cycle 1000. The flow rate of the discharged water is not necessarily used and may be replaced with the amount of discharged water.

Figure 11:
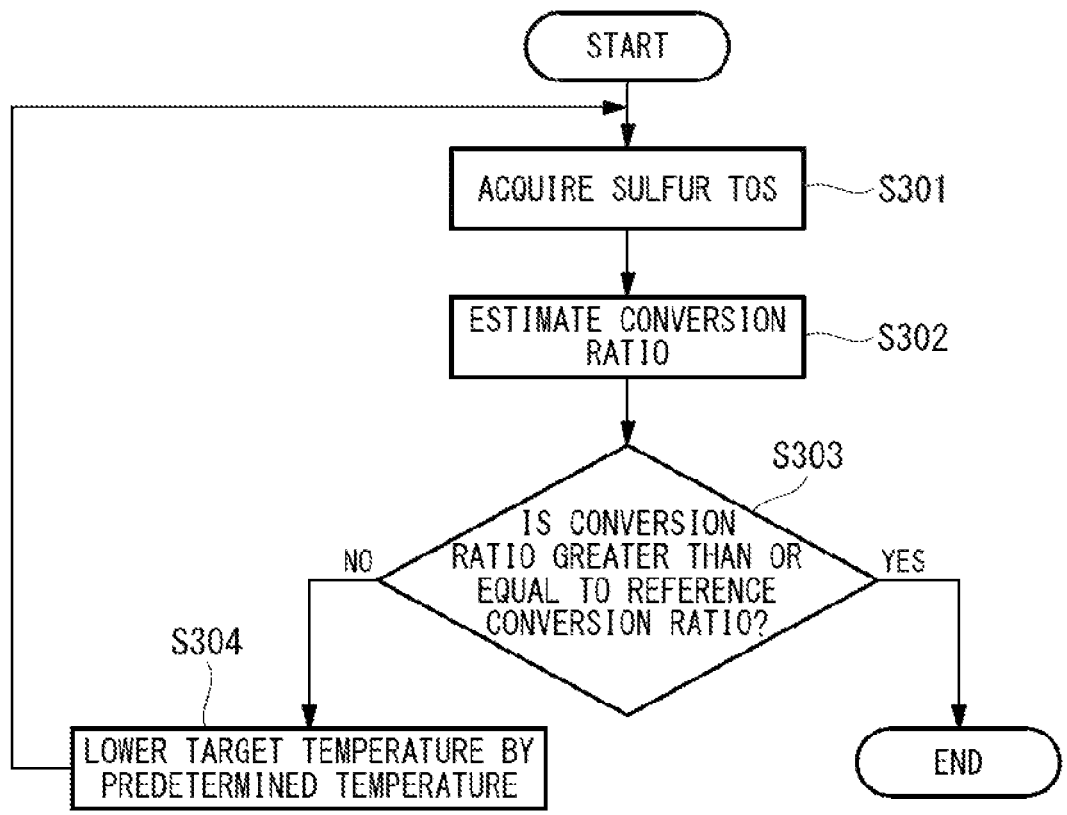
FIG. 11 is a flowchart of the target temperature changing process carried out by the controller according to the second embodiment of the present invention.

The process of changing the target temperature of the transport gas discharged from the pulverizer 10, the process carried out by the controller 50 described above based on the $H_2S$ conversion ratio, will next be described with reference to FIG. 11. The procedure shown in FIG. 11 is repeatedly carried out in a predetermined control cycle when the integrated gasification combined cycle 1000 is in operation. The set (updated) target temperature of the transport gas discharged from the pulverizer 10 is then used in the aforementioned pulverized coal drying process carried out by the controller 50.

The total sulfur contained in the generated gas is first acquired (S301).

The ratio of the conversion from carbonyl sulfide (COS) to hydrogen sulfide (H2S) is then estimated (S302).

It is then evaluated whether or not the conversion ratio is greater than or equal to the reference conversion ratio (S303).

When the conversion ratio is greater than or equal to the reference conversion ratio (YES in evaluation in S303), it is estimated that the sulfur component has been sufficiently removed in the gas clean-up unit 160, and the process is terminated.

When the conversion ratio is not greater than or equal to the reference conversion ratio (NO in evaluation in S303), it is estimated that the sulfur component has not been sufficiently removed in the gas clean-up unit 160, and the target temperature is lowered by the predetermined temperature (S304). The control then returns to S301.

Figure 12:
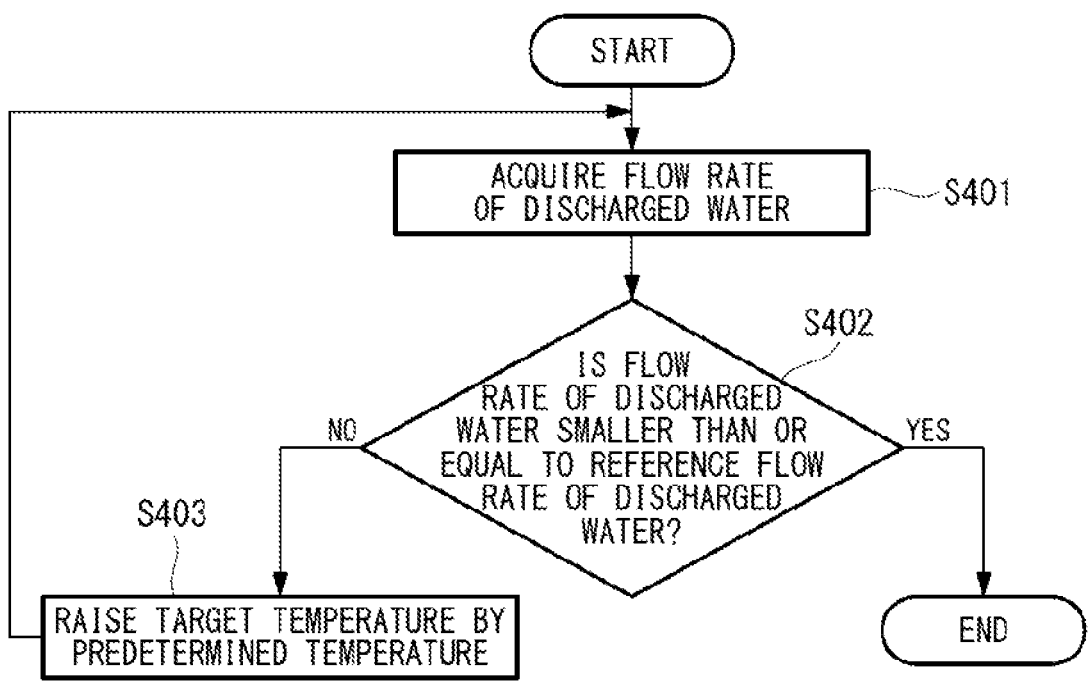
FIG. 12 is another flowchart of the target temperature changing process carried out by the controller according to the second embodiment of the present invention.

The process of changing the target temperature of the transport gas discharged from the pulverizer 10, the process carried out by the controller 50 described above based on the flow rate of the discharged water, will next be described with reference to FIG. 12. The procedure shown in FIG. 12 is repeatedly carried out in a predetermined control cycle when the integrated gasification combined cycle 1000 is in operation. The set (updated) target temperature of the transport gas discharged from the pulverizer 10 is then used in the aforementioned pulverized coal drying process carried out by the controller 50.

The flow rate of the discharged water discharged from the gas clean-up unit 160 is first acquired (S401).

It is then evaluated whether or not the flow rate of the discharged water is smaller than or equal to the reference flow rate of the discharged water (S402).

When the flow rate of the discharged water is smaller than or equal to the reference flow rate of the discharged water (YES in evaluation in S402), it is estimated that the flow rate of the discharged water is not excessive, and the process is terminated.

When the flow rate of the discharged water is not smaller than or equal to the reference flow rate of the discharged water (NO in evaluation in S402), it is estimated that the flow rate of the discharged water is excessive, and the target temperature is raised by the predetermined temperature (S403). The control then returns to S401.

As described above, the pulverized coal drying system for a pulverizer, the pulverized coal drying method therefor, the pulverized coal drying program, the pulverizer, and the integrated gasification combined cycle according to the present embodiment can adjust the dryness of the pulverized coal by changing the target temperature of the transport gas discharged from the pulverizer 10 so that the $H_2S$ conversion ratio approaches the reference conversion ratio. The sulfur component contained in the generated gas can thus be effectively removed, whereby the burden on the environment can be suppressed.

The dryness of the pulverized coal can be adjusted by changing the target temperature of the transport gas discharged from the pulverizer 10 so that the flow rate of the discharged water can be adjusted. The flow rate of the discharged water can thus be suppressed, whereby the burden on the environment can be suppressed.

The present invention is not limited only to the embodiments described above, and a variety of variations are conceivable to the extent that the variations do not depart from the substance of the present invention. The embodiments can be combined with each other.

REFERENCE SIGNS LIST

1 Solid fuel crushing system
10 Pulverizer
11 Housing
12 Rotary table
13 Roller
14 Driver
16 Classifier
17 Fuel Supplier
18 Motor 19 Exit
20 Coal Feeder
21 Banker
22 Transporter
23 Motor
24 Downspout
30 Blowing section
30a Hot gas blower
30b Cool gas blower
30c Hot gas damper
30d Cool gas damper
40 State detector
41 Bottom surface
42 Ceiling
45 Journal Head
47 Support Arm
48 Support Shaft
49 Pressure
50 Controller (pulverized coal drying system)
51 Flow rate controller
52 Temperature setter
60 Pulverized coal dust precipitator
61 Blower
62 Bin
63 Hopper
100 Solid fuel crusher (coal feeding unit)
100a Transport gas channel
100b Supply channel
110a Coal feed line
140 Gasification unit
150 Char recovery unit
160 Gas clean-up unit
170 Gas turbine
180 Steam turbine
190 Generator
200 Boiler
210 Furnace
220 Burner section
400 Heat recovery steam generator
410 Compressed air supply line
420 Air separation unit
430 First nitrogen supply line
450 Second nitrogen supply line
460 Char return line
470 Oxygen supply line
430 Foreign matter removal unit
490 Gas generation line
510 Dust precipitation unit
520 Supply hopper
530 Gas discharge line
610 Compressor
620 Combustor
630 Turbine
640 Rotary shaft
650 Compressed air supply line
660 Fuel gas supply line
670 Combustion gas supply line
680 Pressure booster
690 Turbine
700 Exhaust gas line
710 Steam supply line
720 Steam recovery line
730 Condenser
740 Gas cleaning unit
750 Stack
1000 Integrated gasification combined cycle
1010 Gasifier
1020 Syngas cooler
1100 Pressure vessel
1110 Gasification furnace wall
1150 Annulus
1160 Combustor section
1170 Diffuser section
1180 Reductor section
1210 Gas discharge port
1220 Slag hopper
1260 Burner
1270 Burner
1540 Internal space
1560 External space
A Coal type
B Coal type
TOS Sulfur
To Temperature

The invention claimed is:

1. A pulverized coal drying system for a pulverizer that dries a supplied carbonaceous feedstock by using a drying fluid, the pulverized coal drying system comprising:
a flow rate controller that controls a flow rate of the drying fluid within upper and lower limits of the flow rate of the drying fluid that are set to dry a plurality of types of the carbonaceous feedstock having different moisture contents in such a way that a temperature of the drying fluid discharged from the pulverizer approaches a target temperature, wherein
the drying fluid is a transport gas that transports the carbonaceous feedstock,
the upper and lower limits are set with respect to a predetermined amount of supplied carbonaceous feedstock in a state in which the drying fluid discharged from the pulverizer has the target temperature in such a way that the upper limit is the flow rate of the drying fluid for drying the carbonaceous feedstock containing a largest moisture content and the lower limit is the flow rate of the drying fluid for drying the carbonaceous feedstock containing a lowest moisture content, and
the target temperature is a temperature of the transport gas discharged from the pulverizer, the temperature being expected when the dried carbonaceous feedstock reaches a desired dryness.

2. The pulverized coal drying system according to claim 1, further comprising a temperature setter that lowers the target temperature by a predetermined temperature when the flow rate of the drying fluid reaches the upper limit of the upper and lower limits and raises the target temperature by a predetermined temperature when the flow rate of the drying fluid reaches the lower limit of the upper and lower limits.

3. The pulverized coal drying system according to claim 1, further comprising a temperature setter that changes the target temperature in such a way that a conversion ratio at which carbonyl sulfide is converted into hydrogen sulfide in a raw syngas generated when the carbonaceous feedstock is partially combusted into a gas approaches a predetermined reference conversion ratio.

4. The pulverized coal drying system according to claim 1, further comprising a temperature setter that changes the target temperature in a raw syngas generated when the carbonaceous feedstock is partially combusted into a gas based on a flow rate of discharged water recovered from the raw syngas.

5. A pulverizer comprising the pulverized coal drying system according to claim 1.

6. An integrated gasification combined cycle comprising:
a coal feeding unit including the pulverizer according to claim 5;
a gas turbine rotated by combusting at least part of a combustion gas generated in a gasification unit and purified;
a steam turbine rotated by steam generated in a heat recovery steam generator by using an exhaust gas discharged from the gas turbine; and
a generator linked to the rotary motion of the gas turbine and/or the steam turbine.

7. A pulverized coal drying method for a pulverizer that dries a supplied carbonaceous feedstock by using a drying fluid, the method comprising
a flow rate control step of controlling a flow rate of the drying fluid within upper and lower limits of the flow rate of the drying fluid that are set to dry a plurality of types of the carbonaceous feedstocks having different moisture contents in such a way that a temperature of the drying fluid discharged from the pulverizer approaches a target temperature, wherein the drying fluid is a transport gas that transports the carbonaceous feedstock, the upper and lower limits are set with respect to a predetermined amount of supplied carbonaceous feedstock in a state in which the drying fluid discharged from the pulverizer has the target temperature in such a way that the upper limit is the flow rate of the drying fluid for drying the carbonaceous feedstock containing a largest moisture content and the lower limit is the flow rate of the drying fluid for drying the carbonaceous feedstock containing a lowest moisture content, and the target temperature is a temperature of the transport gas discharged from the pulverizer, the temperature being expected when the dried carbonaceous feedstock reaches a desired dryness.

8. A pulverized coal drying program for a pulverizer that dries a supplied carbonaceous feedstock by using a drying fluid, the program causing a computer to carry out a flow rate control process of controlling a flow rate of the drying fluid within upper and lower limits of the flow rate of the drying fluid that are set to dry a plurality of types of the carbonaceous feedstock having different moisture contents in such a way that a temperature of the drying fluid discharged from the pulverizer approaches a target temperature, wherein the drying fluid is a transport gas that transports the carbonaceous feedstock, the upper and lower limits are set with respect to a predetermined amount of supplied carbonaceous feedstock in a state in which the drying fluid discharged from the pulverizer has the target temperature in such a way that the upper limit is the flow rate of the drying fluid for drying the carbonaceous feedstock containing a largest moisture content and the lower limit is the flow rate of the drying fluid for drying the carbonaceous feedstock containing a lowest moisture content, and the target temperature is a temperature of the transport gas discharged from the pulverizer, the temperature being expected when the dried carbonaceous feedstock reaches a desired dryness.

* * * * *